(12) United States Patent
Puglielli et al.

(10) Patent No.: US 10,775,481 B1
(45) Date of Patent: Sep. 15, 2020

(54) SYSTEMS AND METHODS FOR COMBINING RADAR DATA

(71) Applicant: Zendar Inc., Berkeley, CA (US)

(72) Inventors: Antonio Puglielli, Oakland, CA (US); Ching Ming Wang, El Cerrito, CA (US); Michael Prados, Oakland, CA (US); Vinayak Nagpal, Berkeley, CA (US)

(73) Assignee: Zendar Inc., Berkeley, CA (US)

( * ) Notice: Subject to any disclaimer, the term of this patent is extended or adjusted under 35 U.S.C. 154(b) by 0 days.

(21) Appl. No.: 16/832,259

(22) Filed: Mar. 27, 2020

Related U.S. Application Data

(63) Continuation of application No. PCT/US2020/024937, filed on Mar. 26, 2020.

(60) Provisional application No. 62/840,926, filed on Apr. 30, 2019.

(51) Int. Cl.
| | |
|---|---|
| *G01S 7/295* | (2006.01) |
| *G01S 7/288* | (2006.01) |
| *G01S 13/931* | (2020.01) |
| *G01S 13/87* | (2006.01) |

(52) U.S. Cl.
CPC ............ *G01S 7/295* (2013.01); *G01S 7/288* (2013.01); *G01S 13/87* (2013.01); *G01S 13/931* (2013.01)

(58) Field of Classification Search
CPC .......... G01S 7/295; G01S 7/288; G01S 13/87; G01S 13/931
See application file for complete search history.

(56) References Cited

U.S. PATENT DOCUMENTS

| | | |
|---|---|---|
| 3,939,474 A | 2/1976 | Coleman et al. |
| 3,996,590 A | 12/1976 | Hammack |
| 4,079,378 A * | 3/1978 | Hulderman ............. G01S 7/288 342/198 |
| 5,646,623 A | 7/1997 | Walters et al. |
| 8,742,980 B2 | 6/2014 | Shirakawa |
| (Continued) | | |

FOREIGN PATENT DOCUMENTS

| | | |
|---|---|---|
| FR | 2887096 A1 | 12/2006 |
| WO | WO-2018158281 A1 | 9/2018 |
| WO | WO-2018202257 A1 | 11/2018 |

OTHER PUBLICATIONS

PCT/US2020/024937 International Search Report dated Jun. 18, 2020.

*Primary Examiner* — Timothy X Pham
(74) *Attorney, Agent, or Firm* — Wilson Sonsini Goodrich & Rosati

(57) ABSTRACT

The present disclosure provides a system for processing radar data. The system may comprise a frequency generator configured to generate a reference frequency signal; a timing module configured to generate one or more timing signals; and a plurality of radar modules in communication with the frequency generator and timing module. The radar modules may be configured to: (i) receive the reference frequency signal and the one or more timing signals, (ii) transmit a first set of radar signals based in part on the reference frequency signal and the one or more timing signals, and (iii) receive a second set of radar signals reflected from a surrounding environment. The system may comprise a processor configured to process radar signals received by the plurality of radar modules, by coherently combining radar signals using phase and timestamp information.

27 Claims, 3 Drawing Sheets

(56) References Cited

U.S. PATENT DOCUMENTS

| | | |
|---|---|---|
| 9,547,069 B2 | 1/2017 | Forstner et al. |
| 9,921,305 B2 | 3/2018 | Cao et al. |
| 10,205,457 B1 | 2/2019 | Josefsberg et al. |
| 2005/0179585 A1 | 8/2005 | Walker et al. |
| 2007/0218931 A1 | 9/2007 | Beadle et al. |
| 2012/0212366 A1 | 8/2012 | Alalusi |
| 2013/0241766 A1 | 9/2013 | Kishigami et al. |
| 2014/0062763 A1 | 3/2014 | Kishigami et al. |
| 2015/0309167 A1* | 10/2015 | Shikatani ............... G01S 13/18 342/27 |
| 2015/0369912 A1 | 12/2015 | Kishigami et al. |
| 2017/0212231 A1* | 7/2017 | Iwai ..................... G01S 13/582 |
| 2018/0024233 A1 | 1/2018 | Searcy et al. |
| 2018/0136323 A1* | 5/2018 | Pozdniakov ............ G01S 13/88 |
| 2018/0306902 A1 | 10/2018 | Pernst L; et al. |
| 2020/0124712 A1* | 4/2020 | Christoffers .......... G01S 13/343 |

\* cited by examiner

SYSTEMS AND METHODS FOR COMBINING RADAR DATA

CROSS-REFERENCE

This application is a continuation application of International Application No. PCT/US2020/024937 filed on Mar. 26, 2020, which claims priority to U.S. Provisional Patent Application No. 62/840,926 filed on Apr. 30, 2019, which applications are incorporated herein by reference in their entirety for all purposes.

BACKGROUND

RAdio Detection And Ranging (radar) can be used in many applications including object detection, range-finding, direction-finding and mapping. Traditionally, radar has been used in aerial vehicles, satellites, and maritime vessels to locate objects and image terrain. In recent years, radar has become increasingly popular in automobiles for applications such as blind-spot detection, collision avoidance, and autonomous driving. Unlike optical-based sensors (such as cameras or Light Detection and Ranging (LIDAR) systems) which are affected by changing weather and visibility, radar may be capable of functioning in low light conditions, in the dark, and under all types of weather conditions.

SUMMARY

Recognized herein are various limitations with radar systems currently available. In order to take advantage of radar, vehicles may be equipped with multiple radar sensors to detect obstacles and objects in the surrounding environment. However, the multiple radar sensors in current radar systems may typically process data independently of one another. Provided herein are systems and methods for processing and combining radar data. The performance and robustness of radar systems may be improved by combining data from multiple radar sensors and/or modules prior to the perception, detection, and/or classification of objects or obstacles in a surrounding environment. Further, the radar systems disclosed herein may be configured to resolve computational ambiguities involved with processing and coherently combining radar data from multiple radar sensors and/or modules, in order to identify nearby objects or obstacles and generate one or more local maps of the surrounding environment.

In an aspect, the present disclosure provides a system for processing radar data. The system may comprise a frequency generator configured to generate a reference frequency signal with a reference frequency; a timing module configured to generate one or more timing signals; and a plurality of radar modules in communication with the frequency generator and the timing module. In some embodiments, the plurality of radar modules may be configured to: (i) receive the reference frequency signal and the one or more timing signals, (ii) transmit a first set of radar signals comprising a plurality of outgoing radar pulses based at least in part on (a) the reference frequency signal and (b) the one or more timing signals, and (iii) receive a second set of radar signals comprising a plurality of incoming radar pulses reflected from at least one object in a surrounding environment.

In some embodiments, the system may further comprise a processor configured to process the second set of radar signals received respectively from the plurality of radar modules, by (a) coherently combining the second set of radar signals, (b) computing a property of a target, or (c) generating an occupancy grid or a radar image, using at least (i) phase information associated with the second set of radar signals and (ii) timestamp information associated with the second set of radar signals.

In some embodiments, the system may further comprise at least one housing comprising the frequency generator, the timing module, and the plurality of radar modules. In some embodiments, the at least one housing may be mountable on a vehicle. In some embodiments, the vehicle may comprise a terrestrial vehicle, an aerial vehicle, or an aquatic vehicle.

In some embodiments, the frequency generator may comprise a circuit that is configured to generate a wave signal comprising a sine wave, a square wave, a triangle wave, or a sawtooth wave. The wave signal may have a signal frequency that is predetermined or adjustable in real time.

In some embodiments, the circuit may comprise a crystal oscillator, a simple packaged crystal oscillator, a temperature-controlled crystal oscillator, a voltage-controlled crystal oscillator, a frequency-controlled crystal oscillator, an oven-controlled crystal oscillator, a ring oscillator, an inductor-capacitor (LC) oscillator, or a resistor-capacitor (RC) oscillator.

In some embodiments, the plurality of radar modules may be configured to generate the first set of radar signals using a local oscillator. In some embodiments, the local oscillator may be configured to multiply the reference frequency by one or more frequency multiplier factors. In some embodiments, the local oscillator may comprise an integer-N phase locked loop, a fractional-N phase locked loop, or a frequency multiplier. In some embodiments, the local oscillator may be implemented onboard a radar module of the plurality of radar modules. In some embodiments, the radar module may comprise a radar transmitter and/or a radar receiver. In some embodiments, the local oscillator may be implemented on a board or a chip of the radar transmitter and/or the radar receiver.

In some embodiments, the timing module may be configured to transmit the one or more timing signals to the plurality of radar modules or the processor. In some embodiments, the one or more timing signals may comprise a shared clock signal that is generated based on an absolute time reference or a local time reference. In some embodiments, the one or more timing signals may comprise one or more distinct timing signals for the processor or one or more radar modules of the plurality of radar modules.

In some embodiments, the timing module may be configured to generate one or more distinct timing signals for one or more radar modules of the plurality of radar modules. In some embodiments, the one or more timing signals may comprise the one or more distinct timing signals.

In some embodiments, the plurality of radar modules may be configured to trigger transmission of the first set of radar signals based at least in part on the shared clock signal or the one or more timing signals.

In some embodiments, a radar module of the plurality of radar modules may comprise a timestamp generator configured to label at least a subset of the plurality of incoming radar pulses respectively received by the radar module with one or more timestamps relative to the one or more timing signals, prior to forwarding the plurality of incoming radar pulses to the processor.

In some embodiments, the processor may be configured to generate one or more timestamps for the plurality of incoming radar pulses received by the plurality of radar modules using a shared clock signal generated by the timing module. In some embodiments, the processor may be configured to generate one or more timestamps for the plurality of incoming radar pulses received by the plurality of radar modules using the one or more timing signals generated by the timing module.

In some embodiments, the processor may be configured to use the one or more timestamps generated by the timestamp generator or the processor to chronologically sort the plurality of incoming radar pulses received from the plurality of radar modules.

In some embodiments, the timing module may be configured to generate the shared clock signal based on an absolute time reference or a local time reference.

In some embodiments, the timing module may be configured to modify the one or more timing signals for one or more radar modules prior to transmitting the one or more modified timing signals to the one or more radar modules. In some embodiments, the one or more modified timing signals may comprise one or more distinct timing signals.

In some embodiments, one or more radar modules of the plurality of radar modules may be configured to (i) modify the one or more timing signals received from the timing module and (ii) trigger transmission of the plurality of outgoing radar pulses using the one or more modified timing signals generated at the one or more radar modules.

In some embodiments, the one or more modified timing signals may be generated at least in part by (a) multiplying a frequency of the shared clock signal by one or more frequency multiplier factors and/or by (b) implementing a programmable time delay relative to the shared clock signal.

In some embodiments, the processor may be configured to coherently combine a subset of the plurality of incoming radar pulses received by a subset of the plurality of radar modules by summing one or more complex signals of the subset of the plurality of incoming radar pulses with a relative phase shift or a relative frequency shift. In some embodiments, the relative phase shift or the relative frequency shift may be a function of relative spatial positions and/or relative spatial orientations of the plurality of radar modules.

In some embodiments, the plurality of radar modules may be configured to calibrate the second set of radar signals received by the plurality of radar modules before forwarding the second set of radar signals to the processor. In some embodiments, the plurality of radar modules may be configured to (i) apply a correction based on estimated calibration parameters to the second set of radar signals or (ii) provide the estimated calibration parameters for the second set of radar signals to the processor. In some embodiments, the estimated calibration parameters may be derived in part from one or more variations in phase, gain, delay, and/or bias observed between two or more incoming radar pulses of the plurality of incoming radar pulses. In some embodiments, the estimated calibration parameters may be derived in part from the relative spatial positions or relative spatial orientations of the plurality of radar modules.

In some embodiments, the plurality of radar modules may be configured to calibrate the second set of radar signals using known objects that are visible to the plurality of radar modules in order to identify phase differences between two or more incoming radar pulses of the second set of radar signals received by the plurality of radar modules.

In some embodiments, phase information may comprise one or more phase differences observed between two or more incoming radar pulses of the second sets of radar signals, wherein the two or more incoming radar pulses are received (i) by different receiving antennas within one radar module, (ii) by different radar modules of the plurality of radar modules, and/or (iii) when the vehicle is at different spatial positions or orientations.

In some embodiments, the processor may be configured to generate an occupancy grid using at least (i) the phase information. In some embodiments, the processor may be further configured to generate the occupancy grid using (ii) relative spatial positions or orientations of the plurality of radar modules. In some embodiments, the processor may be further configured to compute a property of the target using the occupancy grid.

In some embodiments, one or more radar modules of the plurality of radar modules may be configured to (a) extract raw unprocessed data from the second set of signals, and (b) provide the raw unprocessed data to the processor for coherent combination, using in part (i) the phase information and (ii) the timestamp information.

In some embodiments, the processor may be configured to compute the property of the target using at least (i) the phase information. In some embodiments, the property of the target may be selected from a group consisting of a shape, a size, a position, an orientation, an angle of arrival, a velocity, an acceleration, and a radar cross section.

In some embodiments, the first set of radar signals may be transmitted by a first radar module and the second set of radar signals may be received at a second radar module. In some embodiments, the second set of radar signals may correspond to a subset of the first set of radar signals that are transmitted by the first radar module and reflected from at least one object in the surrounding environment. In some embodiments, the second radar module may be configured to pre-process the second set of radar signals before providing the second set of radar signals to a processor for coherent combination with an additional second set of radar signals received at a third radar module.

In another aspect, the present disclosure provides a method for processing radar data. In some embodiments, the method may comprise (a) providing a radar system comprising (i) a frequency generator, (ii) a timing module, and (iii) a plurality of radar modules in communication with the frequency generator and the timing module. In some embodiments, the frequency generator may be configured to generate a reference frequency signal with a reference frequency. In some embodiments, the timing module may be configured to generate one or more timing signals. In some embodiments, the method may further comprise (b) receiving the reference frequency signal and the one or more timing signals at the plurality of radar modules. In some embodiments, the method may further comprise (c) using the plurality of radar modules to transmit a first set of radar signals comprising a plurality of outgoing radar pulses based at least in part on the reference frequency signal and the one or more timing signals. In some embodiments, the method may further comprise (d) receiving at the plurality of radar modules a second set of radar signals comprising a plurality of incoming radar pulses reflected from at least one object in a surrounding environment.

In some embodiments, the method may further comprise using a processor to process the second set of radar signals received respectively from the plurality of radar modules, by (a) coherently combining the second set of radar signals, (b) computing a property of a target, or (c) generating an occupancy grid or a radar image, using at least (i) phase information associated with the second set of radar signals and (ii) timestamp information associated with the second set of radar signals.

In some embodiments, the radar system may comprise at least one housing comprising the frequency generator, the timing module, and the plurality of radar modules. In some embodiments, the at least one housing may be mountable on a vehicle. In some embodiments, the vehicle may be a terrestrial vehicle, an aerial vehicle, or an aquatic vehicle.

In some embodiments, the frequency generator may comprise a circuit configured to generate a wave signal comprising a sine wave, a square wave, a triangle wave, or a sawtooth wave with a signal frequency that is predetermined or adjustable in real time. In some embodiments, the circuit may comprise a crystal oscillator, a simple packaged crystal oscillator, a temperature-controlled crystal oscillator, a voltage-controlled crystal oscillator, a frequency-controlled crystal oscillator, an oven-controlled crystal oscillator, a ring oscillator, an inductor-capacitor (LC) oscillator, or a resistor-capacitor (RC) oscillator.

In some embodiments, the plurality of radar modules may be configured to generate the first set of radar signals using a local oscillator that is configured to multiply the reference frequency by one or more frequency multiplier factors. In some embodiments, the local oscillator may comprise an integer-N phase locked loop, a fractional-N phase locked loop, or a frequency multiplier. In some embodiments, the local oscillator may be implemented onboard a radar module of the plurality of radar modules. In some embodiments, the radar module may comprise a radar transmitter and a radar receiver.

In some embodiments, the timing module may be configured to transmit the one or more timing signals to the plurality of radar modules or the processor. In some embodiments, the one or more timing signals may comprise a shared clock signal that is generated based on an absolute time reference or a local time reference.

In some embodiments, the timing module may be configured to transmit the one or more timing signals to the plurality of radar modules or the processor. In some embodiments, the one or more timing signals may comprise one or more distinct timing signals for the processor or one or more radar modules of the plurality of radar modules.

In some embodiments, the plurality of radar modules may be configured to trigger transmission of the first set of radar signals based at least in part on the one or more timing signals.

In some embodiments, a radar module of the plurality of radar modules may comprise a timestamp generator configured to label at least a subset of the plurality of incoming radar pulses respectively received by the radar module with one or more timestamps relative to the one or more timing signals, prior to forwarding the plurality of incoming radar pulses to the processor.

In some embodiments, the processor may be configured to use the one or more timing signals generated by the timing module to (i) generate one or more timestamps for the plurality of incoming radar pulses received by the plurality of radar modules and (ii) chronologically sort the plurality of incoming radar pulses received by the plurality of radar modules.

In some embodiments, the processor may be configured to use the one or more timestamps generated by the timestamp generator to chronologically sort the plurality of incoming radar pulses received from the plurality of radar modules.

In some embodiments, the timing module may be configured to modify the one or more timing signals for one or more radar modules of the plurality of radar modules prior to transmitting the one or more distinct timing signals to the one or more radar modules of the plurality of radar modules.

In some embodiments, a radar module of the plurality of radar modules may be configured to (i) modify the one or more timing signals received from the timing module and (ii) trigger transmission of the plurality of outgoing radar pulses using the one or more modified timing signals generated at the radar module.

In some embodiments, the one or more modified timing signals may be generated at least in part by (a) multiplying a frequency of the shared clock signal by one or more frequency multiplier factors or by (b) implementing a programmable time delay relative to the shared clock signal.

In some embodiments, the processor may be configured to coherently combine a subset of the plurality of incoming radar pulses received by a subset of the plurality of radar modules by summing one or more complex signals of the subset of the plurality of incoming radar pulses with a relative phase shift or a relative frequency shift. In some embodiments, the relative phase shift or the relative frequency shift may be a function of relative spatial positions or relative spatial orientations of the plurality of radar modules.

In some embodiments, the plurality of radar modules may be configured to calibrate the second set of radar signals received by the plurality of radar modules before forwarding the second set of radar signals to the processor.

In some embodiments, the plurality of radar modules may be configured to (i) apply a correction based on estimated calibration parameters to the second set of radar signals or (ii) provide the estimated calibration parameters for the second set of radar signals to the processor. In some embodiments, the estimated calibration parameters are derived in part from one or more variations in phase, gain, delay, or bias observed between two or more incoming radar pulses of the plurality of incoming radar pulses. In some embodiments, the estimated calibration parameters may be derived in part from relative spatial positions or relative spatial orientations of the plurality of radar modules.

In some embodiments, the plurality of radar modules may be configured to calibrate the second set of radar signals using known objects that are visible to the plurality of radar modules in order to identify phase differences between two or more incoming radar pulses of the second set of radar signals received by the plurality of radar modules.

In some embodiments, the phase information may comprise one or more phase differences observed between two or more incoming radar pulses of the second sets of radar signals. In some embodiments, the two or more incoming radar pulses may be received (i) by different receiving antennas within one radar module, (ii) by different radar modules of the plurality of radar modules, or (iii) when the vehicle is at different spatial positions or orientations.

In some embodiments, the processor may be configured to generate an occupancy grid using at least (i) the phase information. In some embodiments, the processor may be further configured to generate the occupancy grid using (ii) relative spatial positions or orientations of the plurality of radar modules. In some embodiments, the processor may be further configured to compute the property of the target using the occupancy grid.

In some embodiments, a radar module of the plurality of radar modules may be configured to (a) extract raw unprocessed data from the second set of signals, and (b) provide the raw unprocessed data to the processor for coherent combination, using in part (i) the phase information and (ii) the timestamp information.

In some embodiments, the processor may be configured to compute the property of the target using at least (i) the phase information. In some embodiments, the property of the target may be selected from a group consisting of a shape, a size, a position, an orientation, an angle of arrival, a velocity, an acceleration, and a radar cross section.

In some embodiments, the first set of radar signals may be transmitted by a first radar module and the second set of radar signals may be received at a second radar module. In some embodiments, the second set of radar signals may correspond to a subset of the first set of radar signals that is transmitted by the first radar module and reflected from the at least one object in the surrounding environment. In some embodiments, the second radar module may be configured to pre-process the second set of radar signals before providing the second set of radar signals to a processor for coherent combination with an additional second set of radar signals received at a third radar module.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
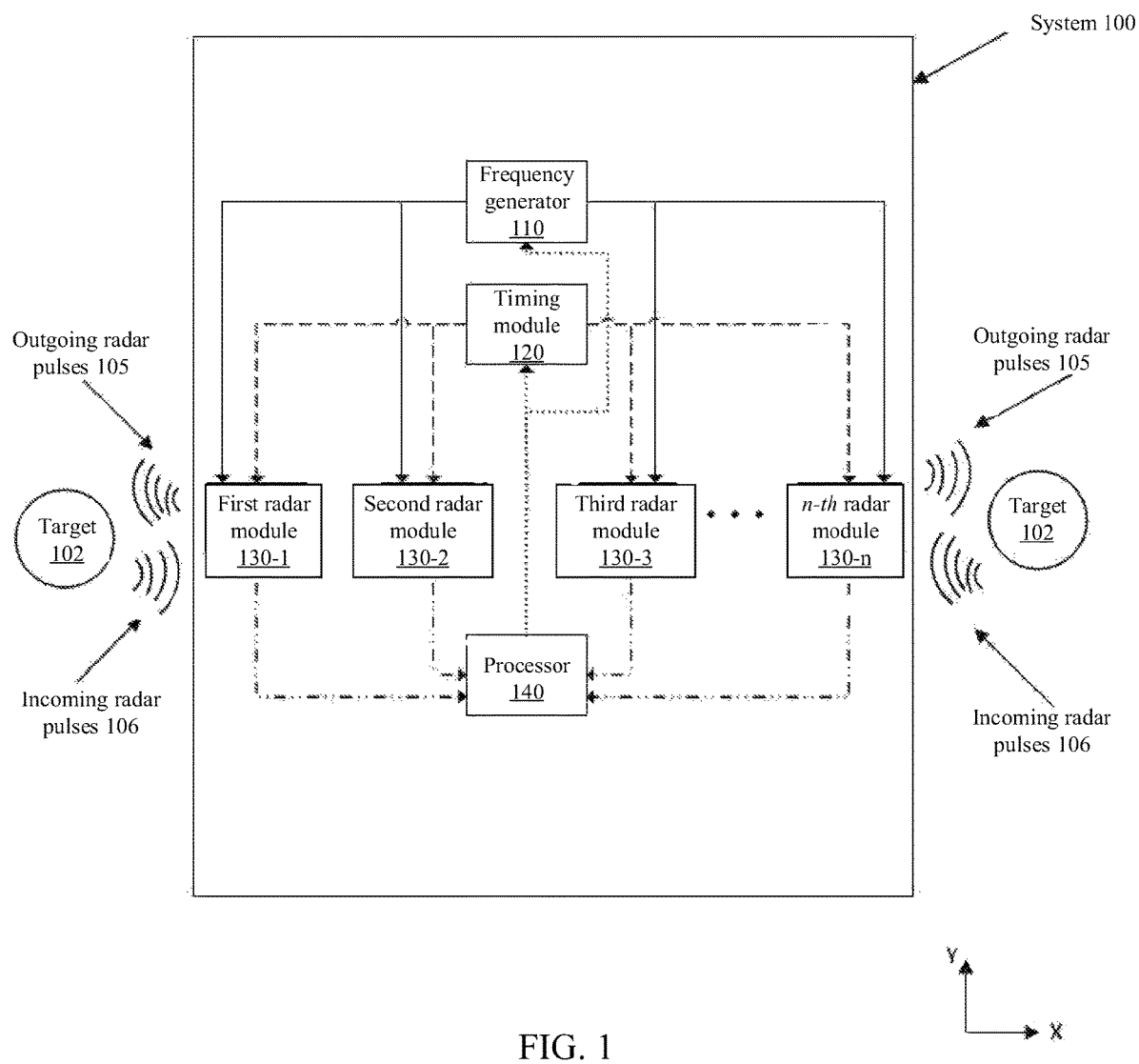
FIG. 1 schematically illustrates a system for processing radar data, in accordance with some embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

In an aspect, the present disclosure provides a system for processing radar data. The system may comprise: a frequency generator configured to generate a reference frequency signal; a timing module configured to generate one or more timing signals; and a plurality of radar modules in communication with the frequency generator and the timing module. The plurality of radar modules may be configured to: (i) receive the reference frequency signal and the one or more timing signals, (ii) transmit a first set of radar signals comprising a plurality of outgoing radar pulses based at least in part on (a) the reference frequency signal and (b) the one or more timing signals, and (iii) receive a second set of radar signals comprising a plurality of incoming radar pulses reflected from at least one object in a surrounding environment. In some cases, the system may further comprise a processor configured to aggregate and process the second set of radar signals received respectively from the plurality of radar modules, by (a) coherently combining the second set of radar signals, (b) computing a property of a target, or (c) generating an occupancy grid or a radar image, using at least (i) phase information associated with the second set of radar signals and (ii) timestamp information associated with the second set of radar signals.

The system may be configured for use with a vehicle. The vehicle may be a self-driving or autonomous vehicle. The vehicle may be operated by a living subject, such as an animal (e.g. a human). The vehicle may be stationary, moving, or capable of movement. The vehicle may be any suitable terrestrial vehicle, aerial vehicle, or aquatic vehicle. A terrestrial vehicle may be a motor vehicle or any other vehicle that uses a source of energy, renewable or nonrenewable (e.g., solar, thermal, electrical, wind, petroleum, etc.), to move across or in close proximity to the ground, such as, for example, within 1 meter, 2 meters, 3 meters of the ground. An aerial vehicle may be a motor vehicle or any other vehicle that uses a source of energy, renewable or nonrenewable, (solar, thermal, electrical, wind, petroleum, etc.) to move through the air or through space. An aquatic vehicle may be a motor vehicle or any other vehicle that uses a source of energy, renewable or nonrenewable, (solar, thermal, electrical, wind, petroleum, etc.) to move across or through water.

In some embodiments, the vehicle may be a land-bound vehicle and travel over land. Alternatively or in addition, the vehicle may be capable of traveling on or in water, underground, in the air, and/or in space. The vehicle may be an automobile. The vehicle may be a land-bound vehicle, watercraft, aircraft, and/or spacecraft. The vehicle may travel freely over a surface. The vehicle may travel freely within two or more dimensions. The vehicle may primarily drive on one or more roads. In some cases, a vehicle as described herein may be capable of operating in the air or in space. For example, the vehicle may be a plane or a helicopter.

In some embodiments, the vehicle may be an unmanned vehicle and may operate without requiring a human operator. In some embodiments, the vehicle may have no passenger or operator on-board. In some embodiments, the vehicle may include a space within which a passenger may ride. In some embodiments, the vehicle may include a space for cargo or objects. In some embodiments, the vehicle may include tools that permit the vehicle to interact with the environment (e.g., collect samples, move objects, and so forth). In some embodiments, the vehicle may include tools that emit objects to the surrounding environment (e.g., light, sound, liquids, and/or pesticides).

In some embodiments, the vehicle may be an autonomous or semi-autonomous vehicle. An autonomous vehicle may be an unmanned vehicle. The autonomous vehicle may or may not have a passenger or operator on-board the vehicle. The autonomous vehicle may or may not have a space within which a passenger may ride. The autonomous vehicle may or may not have space for cargo or objects to be carried by the vehicle. The autonomous vehicle may or may not have tools that may permit the vehicle to interact with the environment (e.g., collect samples, move objects). The autonomous vehicle may or may not have objects that may be emitted to be dispersed to the environment (e.g., light, sound, liquids, pesticides, and so forth). The autonomous vehicle may operate without requiring a human operator. The autonomous vehicle may be a fully autonomous vehicle and/or a partially autonomous vehicle.

In some embodiments, the vehicle may permit one or more passengers to ride on-board. The vehicle may comprise a space for one or more passengers to ride the vehicle. The vehicle may have an interior cabin with space for one or more passengers. The vehicle may have a space for a driver of the vehicle. In some embodiments, the vehicle may be capable of being driven by a human operator. Alternatively or in addition, the vehicle may be operated using an autonomous driving system.

In some embodiments, the vehicle may switch between a manual driving mode during which a human driver may drive the vehicle, and an autonomous driving mode during which an automated controller may generate signals that operate the vehicle without requiring intervention of a human driver. In some embodiments, the vehicle may provide driver assistance where the driver may primarily manually drive the vehicle, but the vehicle may execute certain automated procedures or assist the driver with performing certain procedures (e.g., lane changes, merging, parking, auto-braking). In some embodiments, the vehicle may have a default operation mode. For example, the manual driving mode may be a default operation mode, or an autonomous driving mode may be a default operation mode.

The system may be configured to detect and/or classify one or more targets in a surrounding environment. Detecting a target may involve identifying a presence of a target in a vicinity of the vehicle. Classifying a target may involve determining whether a target is stationary or moving, and/or determining whether or not the target is positioned relative to the vehicle such that the target obstructs or partially obstructs a path of motion of the vehicle. A target may be any object external to the vehicle. A target may be a living being or an inanimate object. A target may be a pedestrian, an animal, a vehicle, a building, a sign post, a sidewalk, a sidewalk curb, a fence, a tree, or any object that may obstruct a vehicle travelling in any given direction. A target may be stationary, moving, or capable of movement.

A target may be located in the front, rear, or lateral side of the vehicle. A target may be positioned at a range of at least about 1 meter (m), 2 m, 3 m, 4 m, 5 m, 10 m, 15 m, 20 m, 25 m, 50 m, 75 m, or 100 m from the vehicle. A target may be located on the ground, in the water, or in the air. A target may be located on or near a motion path of the vehicle. A target may be oriented in any direction relative to the vehicle. A target may be orientated to face the vehicle or oriented to face away from the vehicle at an angle ranging from 0 to about 360 degrees. In some cases, a target may comprise multiple targets external to a terrestrial vehicle.

A target may have a spatial disposition or characteristic that may be measured or detected. Spatial disposition information may include information about the position, velocity, acceleration, and/or other kinematic properties of the target relative to the terrestrial vehicle. A characteristic of a target may include information on the size, shape, orientation, and/or material properties of the target. Material properties may include reflectivity or a radar cross section of the target. In some cases, a characteristic of a target may comprise a measurement of an angle of arrival of the target relative to the vehicle. The angle of arrival may correspond to an elevation angle and/or an azimuth angle associated with an incoming radar signal that is reflected from the target and received at the vehicle.

In some embodiments, a target may have a size of at least 0.2 meters, be in a side facing direction of a terrestrial vehicle, and be at least about 1 meter from a terrestrial vehicle. In some embodiments, a target may have a size of at least 0.2 meters, be in a forward or rear facing direction of a terrestrial vehicle, and be at least about 1 meter from a terrestrial vehicle.

A surrounding environment may be a location and/or setting in which the vehicle may operate. A surrounding environment may be an indoor or outdoor space. A surrounding environment may be an urban, suburban, or rural setting. A surrounding environment may be a high altitude or low altitude setting. A surrounding environment may include settings that provide poor visibility (night time, heavy precipitation, fog, particulates in the air). A surrounding environment may include targets that are on a travel path of a vehicle. A surrounding environment may include targets that are outside of a travel path of a vehicle.

FIG. 1 illustrates an example of a system 100 for processing radar data. The system 100 may comprise a frequency generator 110, a timing module 120, and a plurality of radar modules 130-1, 130-2, 130-3, and so on, up to an nth radar module 130-$n$, where n may be any integer greater than 3. In some cases, n may be greater than or equal to 4, 5, 6, 7, 8, 9, 10, or more. The frequency generator 110 and the timing module 120 may be operatively coupled to and in communication with the plurality of radar modules. Each of the plurality of radar modules may be configured to transmit a first set of signals based on a reference frequency signal generated by the frequency generator and at least one of a shared clock signal or a timing signal generated by the timing module. In any of the embodiments described herein, a timing signal may include a shared clock signal. In some instances, a timing signal may correspond to (or be associated with) a shared clock signal. Alternatively, in any of the embodiments described herein, a shared clock signal and a timing signal may be two separate or distinct signals. A timing signal may be provided as a single timing signal, or as a plurality of timing signals. In some cases, two or more timing signals of the plurality of timing signals may be different. The first set of signals may comprise a plurality of outgoing radar pulses 105. Each of the plurality of radar modules may be configured to receive a second set of signals reflected from a target 102 in a surrounding environment. The second sets of signals may be a subset of the first sets of signals transmitted by each of the plurality of radar modules, and may be generated upon the subset of the first sets of signals interacting with and/or reflecting off of a target 102. The second sets of signals may comprise a plurality of incoming radar pulses 106. The system 100 may further comprise a processor 140 operatively coupled to and in communication with each of the plurality of radar modules. Each of the plurality of radar modules may be configured to provide the second sets of radar signals and/or the plurality of incoming radar pulses 106 respectively received by each of the plurality of radar modules to the processor 140. The processor 140 may be configured to aggregate and process the second sets of radar signals received respectively from the plurality of radar modules, by (a) coherently combining the second sets of radar signals, (b) computing a property of a target, or (c) generating an occupancy grid or a radar image, using at least (i) phase information associated with the second sets of radar signals and (ii) timestamp information associated with the second sets of radar signals. In some cases, the processor 140 may be operatively coupled to and in communication with the frequency generator 110 and the timing module 120. In such cases, the processor 140 may be configured to provide feedback data to the frequency generator 110 and the timing module 120. The frequency generator 110 and the timing module 120 may be configured to receive feedback data from the processor 140. The feedback data may comprise one or more signals derived in part from the second sets of radar signals received by the processor 140 from the plurality of radar modules. The frequency generator 110 and the timing module 120 may be configured to use the feedback data from the processor 140 to adjust, correct, and/or modify the reference frequency signal, the shared clock signal, and/or a timing signal of the plurality of timing signals.

The system may comprise a frequency generator. The frequency generator may be configured to generate a reference frequency signal. The reference frequency signal may be a wave signal with a reference frequency. The wave signal may comprise a sine wave, a square wave, a triangle wave, a sawtooth wave, or any combination thereof. In some cases, the reference frequency may be a predetermined reference frequency. In other cases, the reference frequency may be modified or adjustable in real time as one or more radar signals are being transmitted and/or received by the plurality of radar modules.

The frequency generator may comprise a circuit that is configured to generate a reference frequency signal with a reference frequency. The circuit may comprise a crystal oscillator, a simple packaged crystal oscillator, a temperature-controlled crystal oscillator, a voltage-controlled crystal oscillator, a frequency-controlled crystal oscillator, an oven-controlled crystal oscillator, a ring oscillator, an inductor-capacitor (LC) oscillator, or a resistor-capacitor (RC) oscillator.

The frequency generator may be configured to generate a reference frequency signal with a predetermined reference frequency. The predetermined reference frequency may be at least about 1 hertz (Hz), 10 Hz, 100 Hz, 1 kilohertz (kHz), 10 kHz, 100 kHz, 1 megahertz (MHz), 10 MHz, 100 MHz, 1 gigahertz (GHz), 10 GHz, 100 GHz, 200 GHz, 300 GHz, or more. The predetermined reference frequency may be any frequency between about 1 hertz (Hz) and about 300 gigahertz (GHz). In some cases, the predetermined reference frequency may be 1 megahertz (MHz), 40 MHz, or 4 gigahertz (GHz). The predetermined reference frequency may be a lower frequency than a frequency of the one or more outgoing radar pulses and/or the one or more incoming radar pulses.

In some cases, the frequency generator may be configured to generate a reference frequency signal with a reference frequency that is not predetermined. For example, the reference frequency may be generated by adjusting (e.g., increased and/or decreased) a predetermined reference frequency in real-time based on feedback data from the processor. The feedback data may comprise one or more signals derived in part from the second sets of radar signals received by the plurality of radar modules. The frequency generator may be configured to use the feedback data from the processor to adjust, correct, and/or modify the reference frequency.

The frequency generator may be in communication with each of the plurality of radar modules. The frequency generator may be in communication with the plurality of radar modules through a wired connection or a wireless connection. The wired connection may be a transmission medium that comprises a coax cable, a waveguide, or a twisted pair cable. The wireless connection may be a local connection that is established using connectivity hardware built into and/or internal to the frequency generator and/or the plurality of radar modules. The connectivity hardware may include radio transmitters, radio receivers, antennas, and/or any other hardware configured to allow the frequency generator and/or the plurality of radar modules to process, send, or receive the reference frequency signal.

The frequency generator may be configured to provide and/or distribute the reference frequency signal to each of the plurality of radar modules. The reference frequency signal may be distributed from the frequency generator to each of the plurality of radar modules by a wireless connection, a wired connection (e.g., a coax cable, a waveguide, and/or a twisted pair cable), or any other electrical or electromagnetic transmission medium disclosed herein. The reference frequency signal may be used by each of the plurality of radar modules to generate a first set of radar signals.

In some cases, the frequency generator may be configured to generate a plurality of reference frequency signals comprising one or more reference frequency signals. The one or more reference frequency signals may or may not be the same. The frequency generator may be configured to provide and/or distribute a reference frequency signal of the plurality of reference frequency signals to each of the plurality of radar modules. In some cases, the plurality of reference frequency signals may comprise one or more distinct reference frequency signals. In such cases, the frequency generator may be configured to provide and/or distribute a distinct reference frequency signal to each of the plurality of radar modules. The one or more distinct reference frequency signals may be distributed from the frequency generator to each of the plurality of radar modules by a wired connection or a wireless connection. The one or more distinct reference frequency signals may be used by each radar module of the plurality of radar modules to generate its respective first sets of radar signals.

The system may comprise a timing module. The timing module may be configured to generate at least one of (a) a shared clock signal or (b) a plurality of timing signals. In any of the embodiments described herein, the plurality of timing signals may include the shared clock signal. In some instances, a timing signal from the plurality of timing signals may correspond to (or be associated with) the shared clock signal. Alternatively, in any of the embodiments described herein, the shared clock signal, and the plurality of timing signals, may be separate or distinct types of signals. The timing module may be configured to generate the shared clock signal and/or the plurality of timing signals based on an absolute time reference (e.g., a GPS time receiver) or a local time reference (e.g., a crystal oscillator, a simple packaged crystal oscillator, a temperature-controlled crystal oscillator, a voltage-controlled crystal oscillator, a frequency-controlled crystal oscillator, an oven-controlled crystal oscillator, a ring oscillator, an inductor-capacitor (LC) oscillator, or a resistor-capacitor (RC) oscillator).

The timing module may be configured to generate one or more timing signals. In some embodiments, the one or more timing signals may comprise a shared clock signal as described elsewhere herein. Alternatively, the shared clock signal may be distinct or separate from the one or more timing signals. The shared clock signal may be a clock signal that is shared with and/or available for use by the processor and/or one or more radar modules of the plurality of radar modules. The shared clock signal may be a wave signal (e.g., a square wave) that oscillates between a high state and a low state at a clock frequency. The clock frequency of the shared clock signal may or may not be a predetermined clock frequency.

In some cases, the shared clock signal may have a predetermined clock frequency. The predetermined clock frequency may be at least about 1 hertz (Hz), 10 Hz, 100 Hz, 1 kilohertz (kHz), 10 kHz, 100 kHz, 1 megahertz (MHz), 10 MHz, 100 MHz, 1 gigahertz (GHz), 10 GHz, 100 GHz, 200 GHz, 300 GHz, or more. The predetermined clock frequency may be any frequency between about 1 hertz (Hz) and about 300 gigahertz (GHz).

In some cases, the clock frequency of the shared clock signal may not be predetermined. For example, the shared clock signal may be generated by adjusting a predetermined clock frequency in real-time based on feedback data from the processor. The feedback data may comprise one or more signals derived in part from the second sets of radar signals received by the plurality of radar modules. The timing module may be configured to use the feedback data from the processor to adjust, correct, and/or modify the clock frequency of the shared clock signal.

The timing module may be configured to provide and/or distribute the shared clock signal to one or more radar modules of the plurality of radar modules. In some cases, the shared clock signal may be used by each of the plurality of radar modules to trigger and/or initiate the transmission of the first sets of radar signals. The first sets of radar signals may be transmitted at different times and/or different pulse repetition frequencies. A pulse repetition frequency may be a rate at which a radar module repeatedly transmits one or more successive outgoing radar pulses. In other cases, the shared clock signal may be used to chronologically order the plurality of incoming radar pulses received by each respective radar module of the plurality of radar modules. Chronologically ordering the plurality of incoming radar pulses may involve labeling and/or assigning one or more timestamps to each incoming radar pulse of the plurality of incoming radar pulses received by each of the plurality of radar modules. The one or more timestamps may correspond to a time at which one or more incoming radar pulses are received by each of the plurality of radar modules. The one or more timestamps may be generated based in part on the shared clock signal.

The timing module may be configured to generate a plurality of timing signals comprising the one or more timing signals. In some cases, the plurality of timing signals may be generated based at least in part on the shared clock signal or a multiple of the shared clock signal. In other cases, the plurality of timing signals may be generated independently from the shared clock signal. In such cases, the plurality of timing signals need not be generated using the shared clock signal or a multiple of the shared clock signal. The plurality of timing signals may comprise two or more timing signals for two or more radar modules of the plurality of radar modules. The two or more timing signals may or may not be identical to one another.

The plurality of timing signals generated by the timing module may comprise one or more distinct timing signals. In such cases, different radar modules of the plurality of radar modules may receive different or distinct timing signals. The one or more distinct timing signals may or may not be substantially similar to one another. The one or more distinct timing signals may comprise one or more wave signals (e.g., a sine wave, a square wave, a triangle wave, or a sawtooth wave) that oscillate between a high state and a low state at one or more clock frequencies. In some cases, the one or more clock frequencies may be predetermined clock frequencies. In other cases, the one or more clock frequencies may be modified or adjustable in real time as one or more radar signals are being transmitted and/or received by the plurality of radar modules.

The one or more distinct timing signals may have one or more predetermined clock frequencies. The one or more predetermined clock frequencies may be at least about 1 hertz (Hz), 10 Hz, 100 Hz, 1 kilohertz (kHz), 10 kHz, 100 kHz, 1 megahertz (MHz), 10 MHz, 100 MHz, 1 gigahertz (GHz), 10 GHz, 100 GHz, 200 GHz, 300 GHz, or more. The one or more predetermined clock frequencies may be any frequency between about 1 hertz (Hz) and about 300 gigahertz (GHz).

In some cases, the one or more distinct timing signals of the plurality of timing signals may have one or more clock frequencies that are not predetermined. In such cases, the timing module may be configured to use feedback data from the processor to adjust, correct, and/or modify the one or more clock frequencies of the one or more distinct timing signals in real-time. The feedback data may comprise one or more signals derived in part from the second sets of radar signals received by the plurality of radar modules.

The timing module may be configured to generate the one or more distinct timing signals by modifying at least a subset of the plurality of timing signals generated for the plurality of radar modules. In some cases, generating the one or more distinct timing signals may involve delaying a timing signal for one radar module relative to another timing signal for another radar module of the plurality of radar modules. For example, the timing module may be configured to generate a first distinct timing signal that may be used to trigger the transmission of a first set of radar signals by a first radar module. The timing module may be further configured to generate a second distinct timing signal by implementing a time delay relative to the first timing signal. The second distinct timing signal may be used to trigger the transmission of another first set of radar signals by a second radar module. The first radar module and the second radar module may be configured to use the first distinct timing signal and the second distinct timing signal to transmit their respective first sets of radar signals at different times. In some cases, the one or more distinct timing signals may be generated by modifying a clock frequency of a timing signal of the plurality of timing signals. For example, a distinct timing signal for a radar module may be generated by multiplying the clock frequency of another timing signal for another radar module, by a frequency multiplier factor. In such cases, the first radar module and the second radar module may be configured to use the first distinct timing signal and the second distinct timing signal to transmit their respective first sets of radar signals at different pulse repetition frequencies.

The timing module may be in communication with the processor and each of the plurality of radar modules. The timing module may be in communication with the processor and each of the plurality of radar modules through a wired connection or a wireless connection. The timing module may be configured to transmit the plurality of timing signals to the processor and/or the plurality of radar modules by coax cable, waveguide, twisted pair cable, or any other electrical or electromagnetic transmission medium disclosed herein.

The timing module may be configured to provide the plurality of timing signals comprising the one or more distinct timing signals to each of the plurality of radar modules. In some cases, the one or more distinct timing signals may be used by each of the plurality of radar modules to trigger and/or initiate the transmission of the first sets of radar signals. The first sets of radar signals may be transmitted at different times and/or different pulse repetition frequencies. In other cases, the one or more distinct timing signals may be used to chronologically order the plurality of incoming radar pulses received by each respective radar module of the plurality of radar modules. Chronologically ordering the plurality of incoming radar pulses may involve labeling and/or assigning one or more timestamps to each incoming radar pulse of the plurality of incoming radar pulses received by each of the plurality of radar modules. The one or more timestamps may correspond to a time at which one or more incoming radar pulses are received by each of the plurality of radar modules. The one or more timestamps may be generated based in part on the one or more distinct timing signals of the plurality of timing signals.

In some cases, the timing module may be in communication with one or more additional sensors, such as a global navigation satellite system (GNSS) receiver, a global positioning system (GPS) receiver, an inertial measurement unit (IMU), or a light detection and ranging (lidar) unit. The one or more additional sensors may be in communication with the timing module through a wired connection or a wireless connection. In such cases, the timing module may be configured to transmit the shared clock signal and/or the plurality of timing signals to the one or more additional sensors.

The system may comprise a plurality of radar modules. The plurality of radar modules may comprise a radar module. The radar module may comprise a radar transmitter and/or a radar receiver. The radar transmitter may comprise a transmitting antenna. The radar receiver may comprise a receiving antenna. A transmitting antenna may be any antenna (dipole, directional, patch, sector, Yagi, parabolic, grid) that can convert electrical signals into electromagnetic waves and transmit the electromagnetic waves. A receiving antenna may be any antenna (dipole, directional, patch, sector, Yagi, parabolic, grid) that can receive electromagnetic waves and convert the radiofrequency radiation waves into electrical signals. In some cases, the radar module may include one or more transmitting antennas and/or one or more receiving antennas. In some cases, the radar module may have a plurality of RX and/or TX channels. The radar module may be used to detect one or more targets in a surrounding environment.

The plurality of radar modules may be in communication with the frequency generator and the timing module. The plurality of radar modules may be in communication with the frequency generator and the timing module through a wired connection or a wireless connection. Each radar module of the plurality of radar modules may be configured to receive the reference frequency signal from the frequency generator. Each radar module of the plurality of radar modules may be further configured to receive, from the timing module, at least one of a shared clock signal or a timing signal of the plurality of timing signals generated by the timing module. In some cases, the timing signal may be a distinct timing signal, as described elsewhere herein.

Each radar module of the plurality of radar modules may be configured to transmit a first set of radar signals comprising a plurality of outgoing radar pulses. The plurality of outgoing radar pulses may comprise a radar pulse. A radar pulse may be any electromagnetic wave or signal transmitted by a radar module within a frequency range of about 1 hertz (Hz) to about 300 gigahertz (GHz). In some cases, the plurality of outgoing radar pulses may have a frequency of 24 GHz, 60 GHz, or 79 GHz.

Each radar module of the plurality of radar modules may be configured to generate the first set of radar signals in part based on a reference frequency signal generated by and received from the frequency generator. For example, each radar module may be configured to generate the first set of radar signals by multiplying the reference frequency associated with the reference frequency signal by one or more frequency multiplier factors.

In some cases, each of the plurality of radar modules may be configured to generate its respective first sets of radar signals in part by using a local oscillator. The local oscillator may be configured to multiply the reference frequency by one or more frequency multiplier factors. The one or more frequency multiplier factors may be less than or equal to about 1000000, 100000, 10000, 9000, 8000, 7000, 6000, 5000, 4000, 3000, 2000, 1000, 900, 800, 700, 600, 500, 400, 300, 200, 100, 50, 40, 30, 20, 10, 9, 8, 7, 6, 5, 4, 3, 2, 1, 0.75, 0.67, 0.5, 0.33, 0.25, 0.2, 0.1, or less. In some cases, the one or more frequency multiplier factors may be at least about 1.0, 1.25, 1.5, 1.75, 2, 3, 4, 5, 6, 7, 8, 9, 10, 20, 30, 40, 50, 100, 200, 300, 400, 500, 600, 700, 800, 900, 1000, 2000, 3000, 4000, 5000, 6000, 7000, 8000, 9000, 10000, 100000, 1000000, or more. The local oscillator may be an integer-N phase locked loop, a fractional-N phase locked loop, or a frequency multiplier.

In some cases, the local oscillator may be implemented onboard each of the plurality of radar modules. In such cases, the local oscillator may be implemented on the same board or chip as a radar transmitter and/or a radar receiver of each of the plurality of radar modules. In other cases, the local oscillator may be located remote to the plurality of radar modules and in communication with the plurality of radar modules via a wired connection or a wireless connection. The local oscillator may be configured to operate as a common local oscillator for the plurality of radar modules. For example, a local oscillator implemented on a radar module of the plurality of radar modules may be configured to operate as a local oscillator for another radar module of the plurality of radar modules.

The plurality of radar modules may be configured to modulate the first sets of radar signals and/or the plurality of outgoing radar pulses before transmitting the first sets of radar signals and/or the plurality of outgoing radar pulses. Modulation may involve varying one or more properties (e.g., frequency, phase, delay, and/or amplitude) of the first sets of radar signals in part by using a modulating signal. In some cases, the modulating signal may be the reference frequency signal, the shared clock signal, and/or a timing signal of the plurality of timing signals generated by the timing module. In other cases, the modulating signal may be any signal generated by a local oscillator (e.g., an integer-N phase locked loop, a fractional-N phase locked loop, or a frequency multiplier) of each of the plurality of radar modules. The local oscillator may or may not be implemented onboard each of the plurality of radar modules. Modulation may be performed using one or more modulation schemes. The one or more modulation schemes may include amplitude modulation, double-sideband modulation, single-sideband modulation, vestigial sideband modulation, quadrature amplitude modulation, angle modulation, frequency modulation, phase modulation, transpositional modulation, pulse-amplitude modulation, wavelet modulation, fractal modulation, phase-shift keying, frequency-shift keying, amplitude-shift keying, binary phase-shift keying, quadrature phase-shift keying, differential quadrature phase-shift keying, offset quadrature phase-shift keying, minimum shift keying, Gaussian minimum shift keying, and/or any combination thereof. In some cases, the one or more modulation schemes may implement one or more spread-spectrum techniques such as chirp spread spectrum, direct-sequence spread spectrum, frequency-hopping spread spectrum, and/or time-hopping spread spectrum. In other cases, the one or more modulation schemes may implement one or more multiplexing techniques such as space-division multiplexing, frequency-division multiplexing, time-division multiplexing, polarization-division multiplexing, orbital angular momentum multiplexing, and/or code-division multiplexing (e.g., code-division multiple access (CDMA)).

The plurality of radar modules may be configured to control the time and/or the rate of transmission of the first sets of radar signals based in part on the shared clock signal or the plurality of timing signals. The shared clock signal and/or the plurality of timing signals may indicate to each of the plurality of radar modules when to transmit its respective first set of radar signals comprising the plurality of outgoing radar pulses. The shared clock signal and/or the plurality of timing signals may indicate to each of the plurality of radar modules how frequently to transmit its respective first set of radar signals comprising the plurality of outgoing radar pulses. In some cases, each of the plurality of radar modules may use the shared clock signal or a distinct timing signal of the plurality of timing signals to trigger the transmission of its respective first set of radar signals at a desired time or at a desired pulse repetition frequency. In other cases, the plurality of radar modules may use the shared clock signal or a timing signal of the plurality of timing signals to chronologically order the plurality of incoming radar pulses received by each respective radar module of the plurality of radar modules. Ordering the plurality of outgoing radar pulses may involve assigning one or more timestamps to each incoming radar pulse of the plurality of incoming radar pulses received by each of the plurality of radar modules. The one or more timestamps may correspond to a time at which one or more incoming radar pulses are received by each of the plurality of radar modules. The one or more timestamps may be generated based in part on the shared clock signal and/or a timing signal of the plurality of timing signals.

In some cases, the plurality of radar modules may be configured to directly trigger transmission of the plurality of outgoing radar pulses using the shared clock signal or the plurality of timing signals generated by the timing module. In other cases, each of the plurality of radar modules may be configured to (i) modify one or more timing signals of the plurality of timing signals received from the timing module and (ii) trigger transmission of the plurality of outgoing radar pulses using a plurality of modified timing signals generated at each of the plurality of radar modules. The plurality of modified timing signals may be generated in part by (a) multiplying a frequency of the shared clock signal by one or more frequency multiplier factors and/or by (b) implementing a programmable time delay relative to the shared clock signal. The one or more frequency multiplier factors may be less than or equal to about 1000000, 100000, 10000, 9000, 8000, 7000, 6000, 5000, 4000, 3000, 2000, 1000, 900, 800, 700, 600, 500, 400, 300, 200, 100, 50, 40, 30, 20, 10, 9, 8, 7, 6, 5, 4, 3, 2, 1, 0.75, 0.67, 0.5, 0.33, 0.25, 0.2, 0.1, or less. In some cases, the one or more frequency multiplier factors may be at least about 1.0, 1.25, 1.5, 1.75, 2, 3, 4, 5, 6, 7, 8, 9, 10, 20, 30, 40, 50, 100, 200, 300, 400, 500, 600, 700, 800, 900, 1000, 2000, 3000, 4000, 5000, 6000, 7000, 8000, 9000, 10000, 100000, 1000000, or more. The programmable time delay may be a time delay of 10 seconds, 9 seconds, 8 seconds, 7 seconds, 6 seconds, 5 seconds, 4 seconds, 3 seconds, 2 seconds, 1 second, 0.9 seconds, 0.8 seconds, 0.7 seconds, 0.6 seconds, 0.5 seconds, 0.4 seconds, 0.3 seconds, 0.2 seconds, 0.1 seconds, 0.01 seconds, 1 millisecond (ms), 0.1 ms, 0.01 ms, 1 microsecond (µs), 0.1 µs, 0.01 µs, 1 nanosecond (ns), or less relative to the shared clock signal and/or a timing signal of the plurality of timing signals generated by the timing module. In some cases, the programmable time delay may be adjusted by each of the plurality of radar modules by modifying and/or delaying a timing signal received by a radar module of the plurality of radar modules relative to the shared clock signal and/or another timing signal of the plurality of timing signals generated by the timing module.

Each radar module of the plurality of radar modules may be configured to receive a second set of radar signals comprising a plurality of incoming radar pulses reflected from a surrounding environment. The plurality of incoming radar pulses may comprise a radar pulse. A radar pulse may be any electromagnetic wave or signal received by a radar module within a frequency range of about 1 Hertz (Hz) to about 300 GigaHertz (GHz). In some cases, the second set of radar signals may be a subset of the first set of radar signals. Each radar module of the plurality of radar modules may be configured to receive a subset of the plurality of outgoing radar pulses that are transmitted by the transmitting antenna and reflected back to the receiving antenna after interacting with external targets in the surrounding environment. In some embodiments, one or more receiving antennas may be used to receive a subset of the plurality of outgoing radar pulses that are transmitted by one or more transmitting antennas and reflected back to each radar module of the plurality of radar modules after interacting with external targets in the surrounding environment. The second sets of radar signals received by the plurality of radar modules may carry information about the distance or range of a target relative to the vehicle. The information about the distance or range of a target relative to the vehicle may be based on a round trip time delay of the one or more incoming radar pulses, or a phase of the one or more incoming radar pulses. The round trip time delay may provide spatial resolution relative to a bandwidth of the system.

In some cases, the first set of radar signals may be transmitted by a first radar module and the second set of radar signals may be received at a second radar module. The second radar module may be another radar module of the plurality of radar modules that is different than the first radar module. The second radar module may be in communication with and/or operatively coupled to the first radar module. The second set of radar signals may be associated with the first set of radar signals. The second set of radar signals may correspond to a subset of the first set of radar signals that is transmitted by the first radar module and reflected from the surrounding environment.

In some cases, the second radar module may be configured to pre-process the second set of radar signals before providing the second set of radar signals to a processor for coherent combination with an additional second set of radar signals received at a third radar module. The additional second set of radar signals may be a distinct second set of radar signals received at the third radar module. The third radar module may be different than the second radar module. In some cases, pre-processing the second set of radar signals may involve modulating one or more properties of the second set of radar signals (e.g., frequency, phase, delay, and/or amplitude). In other cases, pre-processing the second set of radar signals may involve demodulating the second set of radar signals. As described elsewhere herein, demodulating the second set of radar signals may involve extracting one or more signals (e.g., information-bearing electronic signals) from the second set of radar signals and/or a plurality of incoming radar pulses of the second set of radar signals.

The phase of the one or more incoming radar pulses may provide spatial resolution relative to a carrier frequency of the first and/or second sets of radar signals. In some cases, the carrier frequency may be 79 GHz. The phase information may contain ambiguities that can be resolved using phase differences between two or more incoming radar pulses received at different spatial points. For example, the two or more incoming radar pulses may be received at different transmitting and/or receiving antennas. In some cases, the two or more incoming radar pulses may be received at different vehicle positions and/or orientations.

In some cases, each of the plurality of radar modules may be configured to independently transmit, receive, and process the second sets of radar signals and/or the plurality of incoming radar pulses respectively received by each of the plurality of radar modules. Processing the second sets of radar signals and/or the plurality of incoming radar pulses may involve demodulating the second sets of radar signals and/or the plurality of incoming radar pulses. Demodulation may involve extracting one or more signals (e.g., information-bearing electronic signals) from the second sets of radar signals and/or the plurality of incoming radar pulses. In some cases, demodulation may be performed using a direct-conversion receiver. The direct-conversion receiver may demodulate the incoming radar pulses using synchronous detection driven by a local oscillator with a frequency that is identical to or very close to a frequency of the incoming radar pulses. In such cases, the second sets of radar signals and/or the incoming radar pulses may be mixed down to a baseband signal. The baseband signal may be a complex baseband signal with real and imaginary components. The complex baseband signal may comprise an in-phase signal and a quadrature-phase signal. The plurality of radar modules may be configured to transmit the complex baseband signal to a processor for signal aggregation and/or signal processing. The complex baseband signal may be transmitted to the processor in either analog form or digital form. The complex baseband signal may be processed by the plurality of radar modules and/or the processor in either analog form or digital form. In other cases, demodulation may be performed using a superheterodyne receiver. The superheterodyne receiver may demodulate the incoming radar pulses by using a frequency mixer to convert a frequency of the incoming radar pulses to an intermediate frequency. In such cases, demodulating the first sets of radar signals may involve shifting the second sets of radar signals to an intermediate frequency. The intermediate frequency may be generated by mixing a frequency of the second sets of radar signals with the reference frequency or a frequency of a signal generated by a local oscillator of each of the plurality of radar modules. In some cases, the incoming radar pulses may be mixed down to a non-zero intermediate frequency. In such cases, the plurality of radar modules may be configured to transmit the incoming radar pulses mixed down to a non-zero intermediate frequency to a processor for signal aggregation and/or signal processing. The incoming radar pulses mixed down to a non-zero intermediate frequency may be transmitted to the processor in either analog form or digital form. The incoming radar pulses mixed down to a non-zero intermediate frequency may be processed by the plurality of radar modules and/or the processor in either analog form or digital form.

In any of the embodiments disclosed herein, the system may further comprise a processor configured to aggregate and/or process the second sets of radar signals received respectively from the plurality of radar modules. The processor may comprise a computer processor, an application specific integrated circuit, a graphics processing unit, or a field programmable gate array. Aggregating the second sets of radar signals may involve gathering one or more of the plurality of incoming radar pulses received by at least a subset of the plurality of radar modules. Processing the second sets of radar signals may involve adding two or more of the plurality of incoming radar pulses together, coherently combining two or more of the plurality of incoming radar pulses based on one or more properties of the radar signals (e.g., frequency, phase, delay, and/or amplitude), computing one or more properties or characteristics of a target in a surrounding environment using data derived from two or more of the plurality of incoming radar pulses, and/or generating an occupancy grid.

The processor may be configured to process the second sets of radar signals received from the plurality of radar modules by coherently combining at least a subset of the plurality of incoming radar pulses. Coherently combining at least a subset of the plurality of incoming radar pulses may involve adding together two or more incoming radar pulses using at least (i) phase information (e.g., phase differences) associated with the second sets of radar signals and/or (ii) timestamp information associated with the second sets of radar signals. The phase information may comprise one or more phase differences observed between two or more incoming radar pulses of the second sets of radar signals. In any of the embodiments described herein, the two or more incoming radar pulses used to determine a phase difference may correspond to two or more incoming radar pulses received (i) by different receiving antennas within one radar module, (ii) by different radar modules of the plurality of radar modules and/or (iii) when the vehicle is at different spatial positions or orientations. For example, the two or more incoming radar pulses may be received by a first radar module from one side of the vehicle and a second radar module from another side of the vehicle. Alternatively, the two or more incoming radar pulses may comprise a first incoming radar pulse received by a first radar module when the vehicle is in a first spatial position and/or a first orientation and a second incoming radar pulse received by the first radar module when the vehicle is in a second spatial position and/or a second orientation. The timestamp information may include information on when one or more incoming radar pulses of the plurality of incoming radar pulses are received by each radar module of the plurality of radar modules. In some cases, the timestamp information may include information on when one or more outgoing radar pulses of the plurality of outgoing radar pulses were transmitted by each radar module of the plurality of radar modules. The timestamp information may be generated by the processor.

The processor may be configured to coherently combine a subset of the plurality of incoming radar pulses received by a subset of the plurality of radar modules. Coherently combining a subset of the plurality of incoming radar pulses may involve summing two or more complex baseband signals derived from the subset of the plurality of incoming radar pulses. At least one of the two or more complex baseband signals may be modulated with a relative phase shift or a relative frequency shift before the two or more complex baseband signals are coherently combined. The relative phase shift may be a measurement of a difference in phase between two or more incoming radar pulses of a subset of the plurality of incoming radar pulses received by a subset of the plurality of radar modules. In some cases, the relative phase shift may be a measurement of a difference in phase between a first set of radar signals transmitted by a transmitting antenna and a second set of radar signals received by a receiving antenna. The relative frequency shift may be a measurement of a difference in frequency between two or more incoming radar pulses of a subset of the plurality of incoming radar pulses received by a subset of the plurality of radar modules.

The relative phase shift and/or the relative frequency shift may be a function of one or more relative spatial positions of the plurality of radar modules and/or one or more relative spatial orientations of the plurality of radar modules. For example, in some cases, the relative phase shift and/or the relative frequency shift may be a function of one or more relative fixed distances between two or more of the plurality of radar module. The one or more relative fixed distances may be at least about 1 millimeter (mm), 2 mm, 3 mm, 4 mm, 5 mm, 6 mm, 7 mm, 8 mm, 9 mm, 10 mm, 10 centimeter (cm), 100 cm, or 1 meter in any direction. The one or more relative fixed distances may have a tolerance based on a pre-defined threshold value. The pre-defined threshold value may be associated with a percentage of a wavelength of an outgoing radar pulse or an incoming radar pulse, or a percentage of a fraction of a wavelength of an outgoing radar pulse or an incoming radar pulse. In other cases, the relative phase shift and/or the relative frequency shift may be a function of an angle between a first direction of alignment for one radar module of the plurality of radar modules and a second direction of alignment for another radar module of the plurality of radar modules. The angle between the first direction of alignment and the second direction of alignment may range from about 0 degrees to about 360 degrees in the XY plane, the XZ plane, and/or the YZ plane. The angle between the first direction of alignment and the second direction of alignment may be at least about 0 degrees, 10 degrees, 20 degrees, 30 degrees, 40 degrees, 45 degrees, 50 degrees, 60 degrees, 70 degrees, 80 degrees, 90 degrees, 100 degrees, 110 degrees, 120 degrees, 130 degrees, 135 degrees, 140 degrees, 150 degrees, 160 degrees, 170 degrees, 180 degrees, 190 degrees, 200 degrees, 210 degrees, 220 degrees, 225 degrees, 230 degrees, 240 degrees, 250 degrees, 260 degrees, 270 degrees, 280 degrees, 290 degrees, 300 degrees, 310 degrees, 315 degrees, 320 degrees, 330 degrees, 340 degrees, 350 degrees, 360 degrees, or any value between 0 degrees and 360 degrees. In some cases, the relative spatial position and/or the relative spatial orientation of the plurality of radar modules may be known a priori. In other cases, the relative spatial position and/or the relative spatial orientation of the plurality of radar modules may be estimated by an online extrinsic calibration algorithm.

As described above, in some cases a first set of radar signals may be transmitted by a first radar module and a second set of radar signals associated with the first set of radar signals may be received at a second radar module. The second radar module may be another radar module of the plurality of radar modules that is different than the first radar module. The second set of radar signals may correspond to a subset of the first set of radar signals that is transmitted by the first radar module and reflected from the surrounding environment. The second radar module may be configured to pre-process the second set of radar signals before providing the second set of radar signals to a processor for coherent combination with one or more radar signals received at a third radar module. The third radar module may be different than the second radar module. The third radar module may be different than the first radar module. The processor may be configured to coherently combine (i) the pre-processed second set of radar signals with (ii) one or more distinct radar signals received by the plurality of radar modules or a subset thereof.

The processor may be configured to compute one or more properties or characteristics of a target in a surrounding environment using data derived from two or more radar signals. The property or characteristic of the target may include a shape, a size, a radar cross section, an angle of arrival, a position, an orientation, a velocity, and/or an acceleration of the target relative to the vehicle. The two or more radar signals may comprise a subset of the plurality of incoming radar pulses received by the plurality of radar modules. The two or more radar signals may be derived by applying a phase shift or a frequency shift to a subset of the plurality of incoming radar pulses received by the plurality of radar modules.

The processor may be configured to use raw data to compute the angle of arrival of one or more targets in the vicinity of the vehicle. Raw data may comprise unprocessed data associated with one or more incoming radar pulses of the plurality of incoming radar pulses. Raw data may include data that has not been demodulated, calibrated, or corrected to account for variations and/or errors in phase, gain, delay, and/or bias. The angle of arrival may be computed based in part on a relationship between the angle of arrival and a phase difference measured between two receiving antennas of the plurality of radar modules. The relationship may be given by:

$$\theta = \sin^{-1}\left(\frac{\lambda \Delta \phi}{2\pi L}\right)$$

where θ is the angle of arrival, L is a distance between two receiving antennas, λ is a wavelength associated with a radar pulse transmitted and/or received by a radar module, and Δϕ is a phase difference measured between the two receiving antennas.

The processor may be configured to use raw data to compute the velocity of one or more targets in the vicinity of the vehicle. The velocity may be computed based in part on a relationship between the velocity and a phase difference measured between two incoming radar pulses received by a receiving antenna of a radar module. The relationship may be given by:

$$v = \frac{\lambda \Delta \phi}{4\pi T_c}$$

where v is the velocity, λ is a wavelength associated with a radar pulse received by a radar module, Δϕ is a phase difference measured between two incoming radar pulses received by a receiving antenna of a radar module, and $T_c$ is the time between successive incoming radar pulses received by a receiving antenna of a radar module.

In some cases, the processor may be configured to modify one or more of the plurality of incoming radar pulses prior to computing a property or a characteristic of a target. For example, the processor may be configured to (i) modify one or more incoming radar pulses by applying a phase shift or a frequency shift and/or (ii) coherently combine two or more incoming radar pulses, prior to computing an angle of arrival or a velocity of the target.

In some cases, the processor and/or each of the plurality of radar modules may be configured to generate an occupancy grid using at least the phase information. An occupancy grid may be a visual representation of the surrounding environment in which the radar system operates. The occupancy grid may represent where in space one or more objects have been detected relative to a position and/or orientation of the vehicle. The occupancy grid may represent the presence of one or more objects in the surrounding environment and in a vicinity of the vehicle. The occupancy grid may show the positions and/or orientations of the one or more objects relative to a position and/or orientation of the vehicle. The vehicle may be stationary or in motion. In some cases, the occupancy grid may be generated and/or updated based on a movement of the vehicle through the surrounding environment.

In some cases, the processor and/or each of the plurality of radar modules may be further configured to generate the occupancy grid using the relative spatial positions and/or the relative spatial orientations of the plurality of radar modules. The relative spatial positions of the plurality of radar modules may involve one or more relative fixed distances between two or more of the plurality of radar module. The one or more relative fixed distances may be at least about 1 millimeter (mm), 2 mm, 3 mm, 4 mm, 5 mm, 6 mm, 7 mm, 8 mm, 9 mm, 10 mm, 10 centimeter (cm), 100 cm, or 1 meter in any direction. The one or more relative fixed distances may have a tolerance based on a pre-defined threshold value. The pre-defined threshold value may be associated with a percentage of a wavelength of an outgoing radar pulse or an incoming radar pulse, or a percentage of a fraction of a wavelength of an outgoing radar pulse or an incoming radar pulse. The relative spatial orientations of the plurality of radar modules may involve an angle between a first direction of alignment for one radar module of the plurality of radar modules and a second direction of alignment for another radar module of the plurality of radar modules. The angle between the first direction of alignment and the second direction of alignment may range from about 0 degrees to about 360 degrees in the XY plane, the XZ plane, and/or the YZ plane. The angle between the first direction of alignment and the second direction of alignment may be at least about 0 degrees, 10 degrees, 20 degrees, 30 degrees, 40 degrees, 45 degrees, 50 degrees, 60 degrees, 70 degrees, 80 degrees, 90 degrees, 100 degrees, 110 degrees, 120 degrees, 130 degrees, 135 degrees, 140 degrees, 150 degrees, 160 degrees, 170 degrees, 180 degrees, 190 degrees, 200 degrees, 210 degrees, 220 degrees, 225 degrees, 230 degrees, 240 degrees, 250 degrees, 260 degrees, 270 degrees, 280 degrees, 290 degrees, 300 degrees, 310 degrees, 315 degrees, 320 degrees, 330 degrees, 340 degrees, 350 degrees, 360 degrees, or any value between 0 degrees and 360 degrees.

In some cases, the processor and/or each of the plurality of radar modules may be configured to generate one or more occupancy grids using the round-trip delay information associated with the second sets of radar signals and/or the plurality of incoming radar pulses. In such cases, the processor and/or each of the plurality of radar modules may be configured to preserve the phase information associated with the second sets of radar signals and/or the plurality of incoming radar pulses after generating the one or more occupancy grids. The processor and/or each of the plurality of radar modules may be configured to combine the one or more occupancy grids generated by each of the plurality of radar modules into a global occupancy grid, using (i) the relative spatial positions and/or relative spatial orientations of the plurality of radar modules and (ii) one or more phase differences between two or more incoming radar pulses received by each of the plurality of radar modules.

In some cases, the processor may be configured to receive raw unprocessed data from the plurality of radar modules. In such cases, the plurality of radar modules may be configured to (a) extract the raw unprocessed data from the second sets of signals and/or the plurality of incoming radar pulses, and (b) provide the raw unprocessed data associated with the second sets of radar signals and/or the plurality of incoming radar pulses to the processor, without generating any occupancy grids. In such cases, the processor may be configured to combine the raw unprocessed data received from the plurality of radar modules and subsequently generate one or more occupancy grids based on the raw unprocessed data associated with the second sets of radar signals and/or the plurality of incoming radar pulses. The processor may be configured to combine the raw unprocessed data in part based on phase information and/or timestamp information associated with the second sets of radar signals and/or the plurality of incoming radar pulses.

In some cases, the processor may be configured to determine one or more characteristics or properties of a target in a vicinity of the vehicle using a perception algorithm. The perception algorithm may be an algorithm that is configured to (i) process one or more complex baseband signals derived from the subset of the plurality of incoming radar pulses and/or (ii) combine two or more complex baseband signals derived from the subset of the plurality of incoming radar pulses. The perception algorithm may be configured to compute one or more characteristics (e.g., size, shape, position, orientation, angle of arrival, or a material property such as reflectivity or radar cross section) or one or more kinematic properties (e.g., velocity or acceleration) of a target in a surrounding environment.

The perception algorithm may be configured to compute and/or derive the one or more characteristics or the one or more kinematic properties of a target by analyzing and/or interpreting a radar image generated by the processor. The radar image may be generated by the processor in part by aggregating and/or processing at least a subset of the second sets of radar signals received by at least a subset of the plurality of radar modules. The radar image may be an occupancy grid and/or a local map. A local map may be a visual representation of a surrounding environment in which a vehicle may be operated. The local map may include data relating to the location, orientation, pose, and/or kinematic properties of the vehicle as the vehicle moves through a surrounding environment. The local map may also include data relating to the location, orientation, pose, and/or kinematic properties of one or more targets in a surrounding environment. The local map may visually represent the position, orientation, and/or motion of the vehicle relative to the location and/or motion of one or more targets in the surrounding environment.

The perception algorithm may be configured to use output information computed and/or generated by the processor (e.g., an occupancy grid and/or a property of the target such as a velocity or an angle of arrival of the target) to compute a higher-order property of a target. For example, the perception algorithm may be configured to use an occupancy grid and a velocity of the target and/or an angle of arrival of the target, to compute a shape, a size, a material property (e.g., reflectivity), and/or a radar cross section of the target. In some cases, the perception algorithm may be configured to use the occupancy grid and/or the one or more properties or characteristics of the target to generate one or more decisions about how to correct and/or adjust a path of motion of the vehicle through a surrounding environment to avoid targets that may obstruct or partially obstruct the path of motion of the vehicle.

The perception algorithm may be configured to classify one or more targets detected by the system. For example, the perception algorithm may be configured to determine whether one or more targets are moving or stationary. Alternatively, the perception algorithm may be configured to determine whether one or more targets obstruct or partially obstruct a motion path of a vehicle travelling through a surrounding environment.

The perception algorithm may be configured to track one or more characteristics (e.g., size, shape, position, orientation, angle of arrival, or a material property such as reflectivity or radar cross section) and/or one or more kinematic properties (e.g., velocity or acceleration) of a target. Tracking the one or more characteristics and/or the one or more kinematic properties of the target may involve measuring a change in the one or more characteristics and/or the one or more kinematic properties over a pre-determined time period. In some cases, the perception algorithm may be configured to track the positions and/or movements of one or more targets in a vicinity of the vehicle as the vehicle moves through the surrounding environment.

The perception algorithm may be configured to refine a measurement and/or an estimate of a characteristic or a property of a target (e.g., a velocity and/or an angle of arrival of the target) previously computed by the processor. Refining a measurement or an estimate of a characteristic or a property of a target may involve updating the measurement or the estimate based on one or more of the plurality of incoming radar pulses received by the plurality of radar modules. In some cases, refining a measurement or an estimate of a characteristic or a property of the target may involve updating the measurement or the estimate based on feedback data. Feedback data may comprise one or more signals derived in part from the second sets of radar signals received by the processor from the plurality of radar modules.

In some cases, the processor may be configured to process the second sets of radar signals received respectively from the plurality of radar modules, by coherently combining the second sets of radar signals using timestamp information associated with the first sets of radar signals and/or the second sets of radar signals. The timestamp information may include information on when one or more incoming radar pulses of the plurality of incoming radar pulses are received by each radar module of the plurality of radar modules. In some cases, the timestamp information may include information on when one or more outgoing radar pulses of the plurality of outgoing radar pulses are transmitted by each radar module of the plurality of radar modules. The timestamp information may be generated by the processor or by a timestamp generator.

In some cases, the plurality of radar modules may be configured to forward the plurality of incoming radar pulses to the processor for signal aggregation (e.g., aggregation of the plurality of incoming radar pulses and/or aggregation of the second sets of radar signals received by each of the plurality of radar modules). In such cases, the processor may be configured to generate timestamps for the plurality of incoming radar pulses received by each of the plurality of radar modules using the shared clock signal generated by the timing module. The timestamps generated by the processor may be generated relative to one or more ticks of the shared clock signal. In some cases, the processor may be configured to use the timestamps generated by the processor to chronologically sort the plurality of incoming radar pulses received by each of the plurality of radar modules.

In other cases, each of the plurality of radar modules may comprise a timestamp generator. The timestamp generator may be configured to label at least a subset of the plurality of incoming radar pulses respectively received by each of the plurality of radar modules with a timestamp relative to the shared clock signal or a timing signal associated with each of the plurality of radar modules. In some cases, the timestamp generator may be configured to timestamp the at least a subset of the plurality of incoming radar pulses respectively received by each of the plurality of radar modules, before the plurality of radar modules forward the plurality of incoming radar pulses to a processor for signal aggregation. In such cases, the processor may be configured to use the timestamps generated by the timestamp generate to chronologically sort the plurality of incoming radar pulses received by each of the plurality of radar modules.

In some cases, the plurality of radar modules may be configured to forward the plurality of incoming radar pulses to the processor for signal aggregation (e.g., aggregation of the plurality of incoming radar pulses and/or aggregation of the second sets of radar signals received by each of the plurality of radar modules). In some cases, the plurality of radar modules may be configured to calibrate the second sets of radar signals received by each of the plurality of radar modules, before forwarding the second sets of radar signals to the processor.

In some cases, the plurality of radar modules may be configured to apply a correction to the second sets of radar signals based on estimated calibration parameters. Alternatively, the plurality of radar modules may be configured to provide the estimated calibration parameters for the second sets of radar signals to the processor without applying any correction to the second sets of radar signals. In such cases, the processor may be configured to modify and/or correct the second sets of radar signals using the estimated calibration parameters received from the plurality of radar modules. The estimated calibration parameters may be derived in part from one or more variations in phase, gain, delay, frequency, and/or bias observed between two or more incoming radar pulses of the plurality of incoming radar pulses. In some cases, the estimated calibration parameters may be derived in part based on the relative spatial positions or relative spatial orientations of the plurality of radar modules.

In some cases, the plurality of radar modules may be configured to calibrate the second sets of radar signals using known objects that are visible to each of the plurality of radar modules in order to identify phase, gain, delay, frequency, or bias differences between two or more incoming radar pulses of the second sets of radar signals received by each of the plurality of radar modules. Each radar module may use a calibration procedure. The calibration procedure may comprise a factory calibration, a lab calibration, and/or an online (e.g., a real-time) calibration algorithm. The calibration procedure used for one radar module of the plurality of radar modules may or may not be substantially similar to the calibration procedure used for another radar module of the plurality of radar modules. The calibration procedure used for one radar module of the plurality of radar modules may or may not be different than the calibration procedure used for another radar module of the plurality of radar modules.

Figure 2:
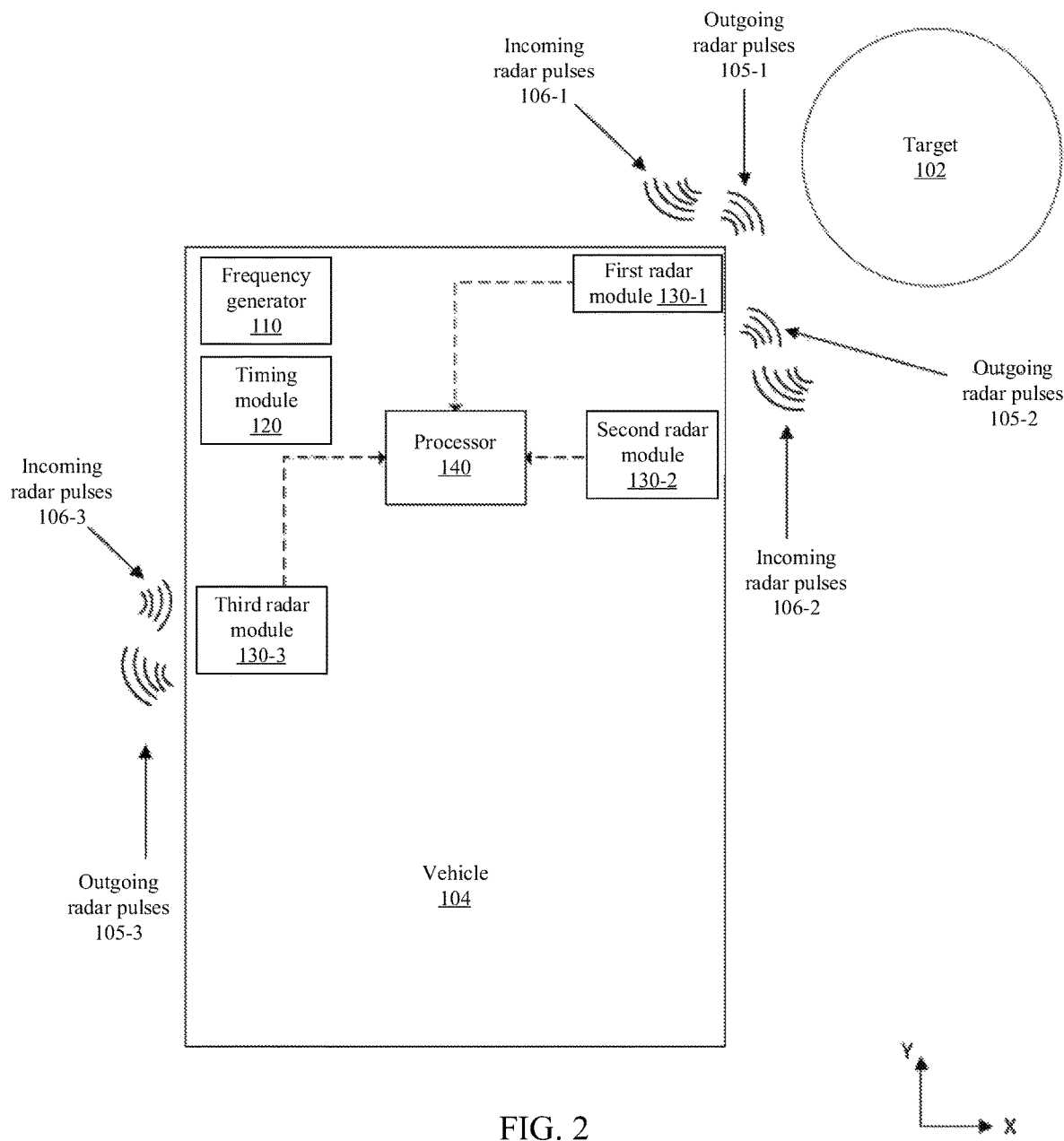
FIG. 2 schematically illustrates a system configured to process radar data from a subset of a plurality of radar modules, in accordance with some embodiments.

FIG. 2 illustrates a system configured to process radar data from a subset of a plurality of radar modules 130-1, 130-2, and 130-3. The plurality of radar modules 130-1, 130-2, and 130-3 may be mounted to any side of a vehicle 104, or to one or more sides of the vehicle 104 (e.g., a front side, a rear side, a lateral side, a top side, or a bottom side of the vehicle). The front side of the vehicle may be the side that is facing a general direction of travel of the vehicle, while a rear (or back) side may be the side that is not facing the general direction of travel of the vehicle. The rear side may be opposite to the front side of the vehicle. The front side of the vehicle may point towards a forward direction of travel of the vehicle. The rear side of the vehicle may point towards a rear direction of travel (e.g. reverse) of the vehicle. The lateral side may include a left side and/or a right side of the vehicle. The vehicle may or may not be configured to move and/or translate orthogonally to the lateral sides of the vehicle. In some cases, the plurality of radar modules 130-1, 130-2, and 130-3 may be mounted between two adjacent sides of the vehicle 104. The plurality of radar modules 130-1, 130-2, and 130-3 may be oriented to detect one or more targets 102 in front of the vehicle 104, behind the vehicle, to the lateral sides of the vehicle, above the vehicle, below the vehicle, or within a vicinity of the vehicle. In some cases, each of the plurality of radar modules 130-1, 130-2, and 130-3 may be configured to be mounted on the same side or different sides of the vehicle 104. For example, one or more radar modules 130-1, 130-2, and 130-3 may be mounted on the top, bottom, front side, rear side, or lateral sides of the vehicle 104. In some cases, each of the plurality of radar modules 130-1, 130-2, and 130-3 may be configured to be mounted in the same or different orientations. For example, one or more radar modules 130-1, 130-2, and 130-3 may be oriented to detect one or more targets 102 in front of the vehicle 104, behind the vehicle 104, to the sides of the vehicle 104, above the vehicle 104, and/or below the vehicle 104.

As illustrated in FIG. 2, the plurality of radar modules 130-1, 130-2, and 130-3 may be configured to transmit the first sets of radar signals comprising a plurality of outgoing radar pulses 105-1, 105-2, and 105-3 based in part on the reference frequency signal and at least one of a shared clock signal or a timing signal of the plurality of timing signals. The reference frequency signal may be generated by a frequency generator 110 that is operatively coupled to and in communication with each of the plurality of radar modules. The shared clock signal and the timing signal of the plurality of timing signals may be generated by a timing module 120 that is operatively coupled to and in communication with each of the plurality of radar modules. The plurality of radar modules 130-1, 130-2, and 130-3 may be configured to receive the second sets of radar signals comprising a plurality of incoming radar pulses 106-1, 106-2, and 106-3. The plurality of radar modules 130-1, 130-2, and 130-3 may be operatively coupled to and in communication with a processor 140. The plurality of radar modules 130-1, 130-2, and 130-3 may be configured to provide the second sets of radar signals and/or the plurality of incoming radar pulses 106-1, 106-2, and 106-3 respectively received by each of the plurality of radar modules to the processor 140. The processor 140 may be configured to aggregate and/or process the second sets of radar signals received respectively from the plurality of radar modules, by (a) coherently combining the second sets of radar signals, (b) computing a property of a target, or (c) generating an occupancy grid or a radar image, using at least (i) phase information associated with the second sets of radar signals and (ii) timestamp information associated with the second sets of radar signals. In some cases, the processor 140 may be configured to coherently combine a subset 106-1 and 106-2 of the plurality of incoming radar pulses received by a subset 130-1 and 130-2 of the plurality of radar modules by summing one or more complex signals of the subset 106-1 and 106-2 of the plurality of incoming radar pulses with a relative phase shift or a relative frequency shift. In some cases, the plurality of radar modules 130-1, 130-2, and 130-3 may be configured to calibrate the second sets of radar signals using an object (e.g., a target 102) that is visible to one or more of the plurality of radar modules in order to identify phase differences between two or more incoming radar pulses 106-1, 106-2, and 106-3 received by each of the plurality of radar modules 130-1, 130-2, and 130-3. In some cases, the processor 140 may be operatively coupled to and in communication with the frequency generator 110 and the timing module 120. In such cases, the processor 140 may be configured to provide feedback data to the frequency generator 110 and the timing module 120. The frequency generator 110 and the timing module 120 may be configured to receive feedback data from the processor 140. The feedback data may comprise one or more signals derived in part from the second sets of radar signals received by the processor 140 from the plurality of radar modules. The frequency generator 110 and the timing module 120 may be configured to use the feedback data from the processor 140 to adjust, correct, and/or modify the reference frequency signal, the shared clock signal, and/or a timing signal of the plurality of timing signals.

Another different aspect of the present disclosure provides a method for processing radar data. The method may comprise providing a radar system comprising a frequency generator, a timing module, and a plurality of radar modules in communication with the frequency generator and the timing module. The frequency generator may be configured to generate a reference frequency signal with a reference frequency. The timing module may be configured to generate one or more timing signals. The method may further comprise receiving the reference frequency signal and the one or more timing signals at the plurality of radar modules. The method may further comprise using the plurality of radar modules to transmit a first set of radar signals comprising a plurality of outgoing radar pulses based at least in part on (a) the reference frequency signal and (b) the one or more timing signals. The method may further comprise receiving, at the plurality of radar modules, a second set of radar signals comprising a plurality of incoming radar pulses reflected from at least one object in a surrounding environment. In some cases, the method may further comprise using a processor to aggregate and/or process the second sets of radar signals received respectively from the plurality of radar modules, by (a) coherently combining the second sets of radar signals, (b) computing a property of a target, or (c) generating an occupancy grid or radar image, using at least (i) phase information associated with the second set of radar signals and (ii) timestamp information associated with the second set of radar signals.

Computer Systems

Figure 3:
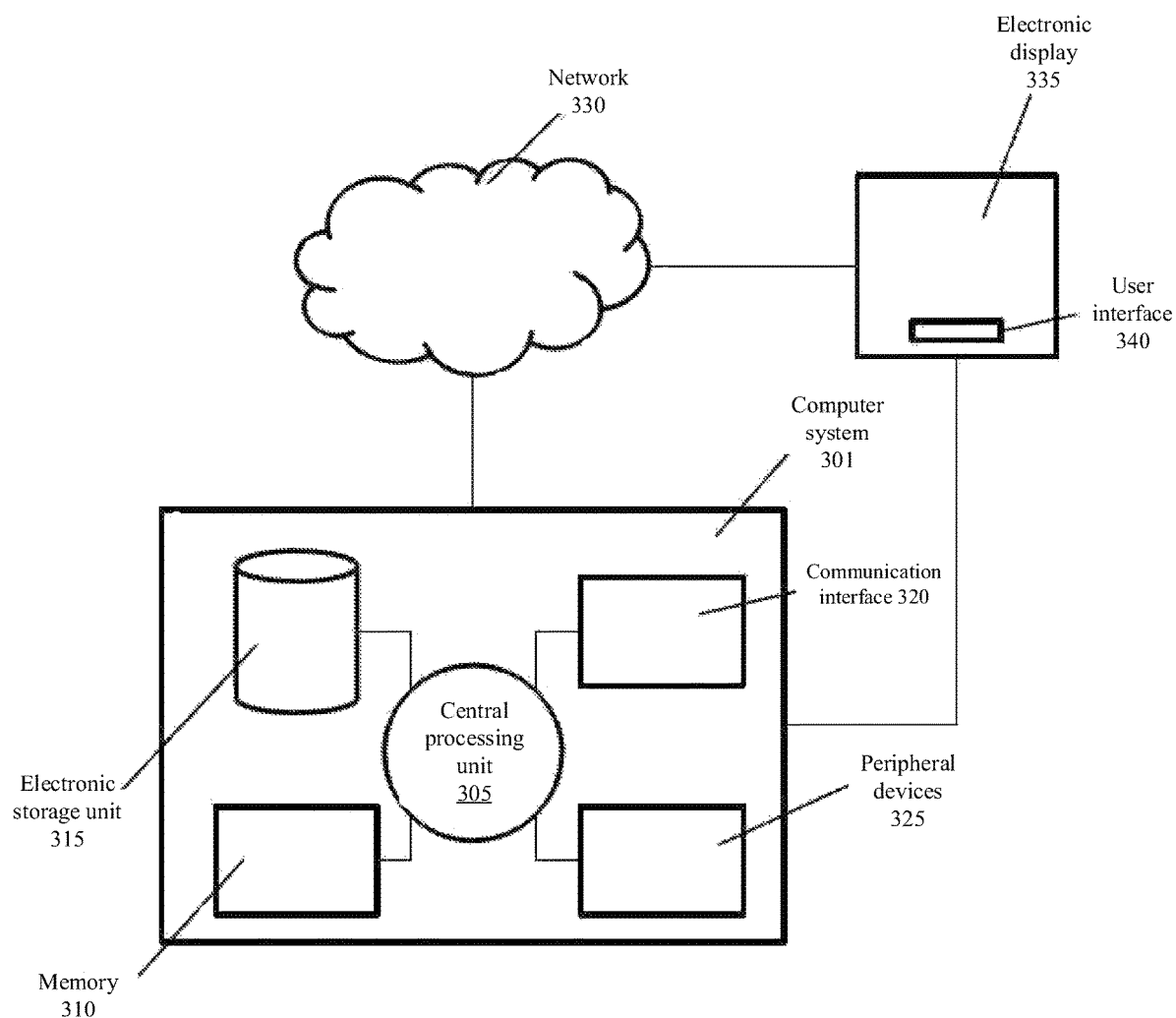
FIG. 3 schematically illustrates a computer system that is programmed or otherwise configured to implement methods provided herein.

Another aspect of the present disclosure provides computer systems that are programmed or otherwise configured to implement methods of the disclosure. FIG. 3 shows a computer system 301 that is programmed or otherwise configured to implement a method for processing radar data. The computer system 301 may be configured to generate a reference frequency signal with a reference frequency using a frequency generator; generate one or more timing signals using a timing module; provide the reference frequency signal and the one or more timing signals to the plurality of radar modules; transmit, using the plurality of radar modules, a first set of radar signals comprising a plurality of outgoing radar pulses based at least in part on (a) the reference frequency signal and (b) the one or more timing signals; and receive, at the plurality of radar modules, a second set of radar signals comprising a plurality of incoming radar pulses reflected from at least one object in a surrounding environment. In some cases, the computer system 301 may be configured to aggregate and/or process the second set of radar signals received respectively from the plurality of radar modules, by (a) coherently combining the second set of radar signals, (b) computing a property of a target, or (c) generating an occupancy grid or a radar image, using at least (i) phase information associated with the second set of radar signals and (ii) timestamp information associated with the second set of radar signals. The computer system 301 can be an electronic device of a user or a computer system that is remotely located with respect to the electronic device. The electronic device can be a mobile electronic device.

The computer system 301 may include a central processing unit (CPU, also "processor" and "computer processor" herein) 305, which can be a single core or multi core processor, or a plurality of processors for parallel processing. The computer system 301 also includes memory or memory location 310 (e.g., random-access memory, read-only memory, flash memory), electronic storage unit 315 (e.g., hard disk), communication interface 320 (e.g., network adapter) for communicating with one or more other systems, and peripheral devices 325, such as cache, other memory, data storage and/or electronic display adapters. The memory 310, storage unit 315, interface 320 and peripheral devices 325 are in communication with the CPU 305 through a communication bus (solid lines), such as a motherboard. The storage unit 315 can be a data storage unit (or data repository) for storing data. The computer system 301 can be operatively coupled to a computer network ("network") 330 with the aid of the communication interface 320. The network 330 can be the Internet, an internet and/or extranet, or an intranet and/or extranet that is in communication with the Internet. The network 330 in some cases is a telecommunication and/or data network. The network 330 can include one or more computer servers, which can enable distributed computing, such as cloud computing. The network 330, in some cases with the aid of the computer system 301, can implement a peer-to-peer network, which may enable devices coupled to the computer system 301 to behave as a client or a server.

The CPU 305 can execute a sequence of machine-readable instructions, which can be embodied in a program or software. The instructions may be stored in a memory location, such as the memory 310. The instructions can be directed to the CPU 305, which can subsequently program or otherwise configure the CPU 305 to implement methods of the present disclosure. Examples of operations performed by the CPU 305 can include fetch, decode, execute, and writeback.

The CPU 305 can be part of a circuit, such as an integrated circuit. One or more other components of the system 301 can be included in the circuit. In some cases, the circuit is an application specific integrated circuit (ASIC).

The storage unit 315 can store files, such as drivers, libraries and saved programs. The storage unit 315 can store user data, e.g., user preferences and user programs. The computer system 301 in some cases can include one or more additional data storage units that are external to the computer system 301, such as located on a remote server that is in communication with the computer system 301 through an intranet or the Internet.

The computer system 301 can communicate with one or more remote computer systems through the network 330. For instance, the computer system 301 can communicate with a remote computer system of a user (e.g., an end user, a consumer, a driver, a vehicle operator, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 301 via the network 330.

Methods as described herein can be implemented by way of machine (e.g., computer processor) executable code stored on an electronic storage location of the computer system 301, such as, for example, on the memory 310 or electronic storage unit 315. The machine executable or machine readable code can be provided in the form of software. During use, the code can be executed by the processor 305. In some cases, the code can be retrieved from the storage unit 315 and stored on the memory 310 for ready access by the processor 305. In some situations, the electronic storage unit 315 can be precluded, and machine-executable instructions are stored on memory 310.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 301 can include or be in communication with an electronic display 335 that comprises a user interface (UI) 340 for providing, for example, a portal for monitoring one or more objects, obstacles, and/or targets detected by the radar system. In some cases, the portal may be used to render, view, monitor, and/or manipulate one or more occupancy grid maps generated by the processor and/or the plurality of radar modules. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 305. The algorithm may be configured to generate a reference frequency signal with a reference frequency using the frequency generator; generate one or more timing signals using the timing module; provide to the plurality of radar modules the reference frequency signal and the one or more timing signals; transmit, using the plurality of radar modules, a first set of radar signals comprising a plurality of outgoing radar pulses based at least in part on (a) the reference frequency signal and (b) the one or more timing signals; and receive, at the plurality of radar modules, a second set of radar signals comprising a plurality of incoming radar pulses reflected from at least one object in a surrounding environment. In some cases, the algorithm may be configured to aggregate and/or process the second set of radar signals received respectively from the plurality of radar modules, by (a) coherently combining the second sets of radar signals, (b) computing a property of a target, or (c) generating an occupancy grid or a radar image, using at least (i) phase information associated with the second set of radar signals and (ii) timestamp information associated with the second set of radar signals.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for processing radar data, comprising:
   a frequency generator configured to generate a reference frequency signal with a reference frequency;
   a timing module configured to generate one or more timing signals;
   a plurality of radar modules in communication with said frequency generator and said timing module, wherein said plurality of radar modules is configured to: (i) receive said reference frequency signal and said one or more timing signals, (ii) transmit a first set of radar signals comprising a plurality of outgoing radar pulses based at least in part on (a) said reference frequency signal and (b) said one or more timing signals, and (iii) receive a second set of radar signals comprising a plurality of incoming radar pulses reflected from at least one object in a surrounding environment; and a processor configured to process said second set of radar signals received from said plurality of radar modules, by (a) coherently combining said second set of radar signals, (b) computing a property of a target, or (c) generating an occupancy grid or a radar image, using at least (i) phase information associated with said second set of radar signals and (ii) timestamp information associated with said second set of radar signals, wherein said plurality of radar modules is configured to calibrate said second set of radar signals using in part at least one of (i) one or more known objects that are visible to said plurality of radar modules and (ii) relative spatial positions or relative spatial orientations of or between said plurality of radar modules, to detect one or more phase differences between two or more incoming radar pulses of said second set of radar signals, prior to said second set of radar signals being forwarded to said processor.

2. The system of claim 1, further comprising at least one housing comprising said frequency generator, said timing module, and said plurality of radar modules, wherein said at least one housing is mountable on a vehicle, wherein said vehicle is a terrestrial vehicle, an aerial vehicle, or an aquatic vehicle.

3. The system of claim 1, wherein said frequency generator comprises a circuit configured to generate a wave signal comprising a sine wave, a square wave, a triangle wave, or a sawtooth wave with a signal frequency that is predetermined or adjustable in real time, wherein said circuit comprises a crystal oscillator, a simple packaged crystal oscillator, a temperature-controlled crystal oscillator, a voltage-controlled crystal oscillator, a frequency-controlled crystal oscillator, an oven-controlled crystal oscillator, a ring oscillator, an inductor-capacitor (LC) oscillator, or a resistor-capacitor (RC) oscillator.

4. The system of claim 1, wherein said plurality of radar modules is configured to generate said first set of radar signals using a local oscillator that is configured to multiply said reference frequency by one or more frequency multiplier factors, wherein said local oscillator comprises an integer-N phase locked loop, a fractional-N phase locked loop, or a frequency multiplier.

5. The system of claim 4, wherein said local oscillator is implemented onboard a radar module of said plurality of radar modules, and wherein said radar module comprises a radar transmitter and a radar receiver.

6. The system of claim 1, wherein said timing module is configured to transmit said one or more timing signals to said plurality of radar modules or said processor, wherein said one or more timing signals comprise a shared clock signal that is generated based on an absolute time reference or a local time reference.

7. The system of claim 6, wherein a radar module of said plurality of radar modules is configured to (i) modify said one or more timing signals received from said timing module and (ii) trigger transmission of said plurality of outgoing radar pulses using said one or more modified timing signals generated at said radar module.

8. The system of claim 7, wherein said one or more modified timing signals are generated at least in part by (a) multiplying a frequency of said shared clock signal by one or more frequency multiplier factors or by (b) implementing a programmable time delay relative to said shared clock signal.

9. The system of claim 1, wherein said timing module is configured to transmit said one or more timing signals to said plurality of radar modules or said processor, wherein said one or more timing signals comprise one or more distinct timing signals for said processor or one or more radar modules of said plurality of radar modules.

10. The system of claim 9, wherein said timing module is configured to modify said one or more timing signals for one or more radar modules of said plurality of radar modules prior to transmitting said one or more distinct timing signals to said one or more radar modules of said plurality of radar modules.

11. The system of claim 1, wherein said plurality of radar modules is configured to trigger transmission of said first set of radar signals based at least in part on said one or more timing signals.

12. The system of claim 1, wherein a radar module of said plurality of radar modules comprises a timestamp generator configured to label at least a subset of said plurality of incoming radar pulses respectively received by said radar module with one or more timestamps relative to said one or more timing signals, prior to forwarding said plurality of incoming radar pulses to said processor.

13. The system of claim 12, wherein said processor is configured to use said one or more timestamps generated by said timestamp generator to chronologically sort said plurality of incoming radar pulses received from said plurality of radar modules.

14. The system of claim 1, wherein said processor is configured to use said one or more timing signals generated by said timing module to (i) generate one or more timestamps for said plurality of incoming radar pulses received by said plurality of radar modules and (ii) chronologically sort said plurality of incoming radar pulses received by said plurality of radar modules.

15. The system of claim 1, wherein said processor is configured to coherently combine a subset of said plurality of incoming radar pulses received by a subset of said plurality of radar modules by summing one or more complex signals of said subset of said plurality of incoming radar pulses with a relative phase shift or a relative frequency shift, wherein said relative phase shift or said relative frequency shift is a function of relative spatial positions or relative spatial orientations of said plurality of radar modules.

16. The system of claim 1, wherein said plurality of radar modules is configured to (i) apply a correction based on estimated calibration parameters to said second set of radar signals or (ii) provide said estimated calibration parameters for said second set of radar signals to said processor.

17. The system of claim 16, wherein said estimated calibration parameters are derived in part from one or more variations in phase, gain, delay, or bias observed or detected between said two or more incoming radar pulses of said second set of radar signal.

18. The system of claim 16, wherein said estimated calibration parameters are derived in part from said relative spatial positions or relative spatial orientations of or between said plurality of radar modules.

19. The system of claim 1, wherein said phase information comprises said one or more phase differences detected between said two or more incoming radar pulses of said second set of radar signals, wherein said two or more incoming radar pulses are received (i) by different receiving antennas within one radar module, (ii) by different radar modules of said plurality of radar modules, or (iii) when said vehicle is at different spatial positions or orientations.

20. The system of claim 19, wherein said processor is configured to generate an occupancy grid using at least (i) said phase information.

21. The system of claim 20, wherein said processor is further configured to generate said occupancy grid using (ii) relative spatial positions or orientations of said plurality of radar modules.

22. The system of claim 20, wherein said processor is further configured to compute said property of said target using said occupancy grid.

23. The system of claim 19, wherein a radar module of said plurality of radar modules is configured to (a) extract raw unprocessed data from said second set of signals, and (b) provide said raw unprocessed data to said processor for coherent combination, using in part (i) said phase information and (ii) said timestamp information.

24. The system of claim 1, wherein said processor is configured to compute said property of said target using at least (i) said phase information, wherein said property of said target is selected from a group consisting of a shape, a size, a position, an orientation, an angle of arrival, a velocity, an acceleration, and a radar cross section.

25. The system of claim 1, wherein said first set of radar signals is transmitted by a first radar module and said second set of radar signals is received at a second radar module.

26. The system of claim 25, wherein said second set of radar signals corresponds to a subset of said first set of radar signals that is transmitted by said first radar module and reflected from said at least one object in said surrounding environment.

27. The system of claim 25, wherein said second radar module is configured to pre-process said second set of radar signals before providing said second set of radar signals to a processor for coherent combination with an additional second set of radar signals received at a third radar module.

* * * * *